(12) United States Patent
Yoshida et al.

(10) Patent No.: US 11,133,743 B2
(45) Date of Patent: Sep. 28, 2021

(54) INDIVIDUAL STEP-UP CIRCUIT, STEP-UP CIRCUIT, AND ELECTRONIC APPARATUS

(71) Applicant: TOHOKU UNIVERSITY, Sendai (JP)

(72) Inventors: Shinya Yoshida, Sendai (JP); Tsutomu Nakamura, Sendai (JP)

(73) Assignee: Tohoku University, Miyagi (JP)

( * ) Notice: Subject to any disclaimer, the term of this patent is extended or adjusted under 35 U.S.C. 154(b) by 0 days.

(21) Appl. No.: 17/272,262

(22) PCT Filed: Aug. 26, 2019

(86) PCT No.: PCT/JP2019/033311
§ 371 (c)(1),
(2) Date: Feb. 26, 2021

(87) PCT Pub. No.: WO2020/045343
PCT Pub. Date: Mar. 5, 2020

(65) Prior Publication Data
US 2021/0175803 A1  Jun. 10, 2021

(30) Foreign Application Priority Data

Aug. 28, 2018 (JP) ............................. JP2018-159617

(51) Int. Cl.
*H02M 3/07* (2006.01)
*H02M 1/088* (2006.01)
*H02M 3/158* (2006.01)

(52) U.S. Cl.
CPC ........... *H02M 3/077* (2021.05); *H02M 1/088* (2013.01); *H02M 3/1584* (2013.01); *H02M 3/158* (2013.01)

(58) Field of Classification Search
CPC .... H02M 1/00; H02M 1/0006; H02M 1/0012; H02M 1/0041; H02M 1/0067;
(Continued)

(56) References Cited

U.S. PATENT DOCUMENTS

| 6,020,781 A | * | 2/2000 | Fujioka | ................... | H02M 1/36 327/541 |
| 6,198,342 B1 | * | 3/2001 | Kawai | ................... | H02M 3/073 327/536 |

(Continued)

FOREIGN PATENT DOCUMENTS

| JP | 2009136112 A | 6/2009 |
| JP | 2010508293 A | 3/2010 |

(Continued)

OTHER PUBLICATIONS

International Search Report and Written Opinion for related PCT App No. PCT/JP2019/033311 dated Nov. 12, 2019, 10 pgs.

*Primary Examiner* — Alex Torres-Rivera
*Assistant Examiner* — David A. Singh
(74) *Attorney, Agent, or Firm* — Procopio, Cory, Hargreaves & Savitch LLP

(57) ABSTRACT

To provide an individual boost circuit capable of boosting a minute power voltage to a target voltage more reliably.

An individual boost circuit includes a first PMOS transistor that has a gate to which a first clock voltage is applied and performs on- and off-operations; a second PMOS transistor that has a gate to which a second clock voltage that has a reciprocal relation with the first clock voltage is applied and performs the on- and off-operations; an auxiliary capacitor; a boost capacitor; an auxiliary charging circuit 211 that charges an auxiliary capacitor via the second PMOS transistor with a power voltage from an external power when the first PMOS translator enters an off-state and the second PMOS transistor enters an on-state; and a boost charging circuit 212 that charges the boost capacitor via the first PMOS transistor with the second clock voltage through the (Continued)

auxiliary capacitor when the first PMOS transistor enters the on-state and the second switching transistor enters the off-state.

22 Claims, 17 Drawing Sheets

(58) Field of Classification Search
CPC .. H02M 1/007; H02M 1/0074; H02M 1/0077; H02M 1/08; H02M 1/088; H02M 3/02; H02M 3/04; H02M 3/06; H02M 3/07; H02M 3/073; H02M 3/075; H02M 3/076; H02M 3/077; H02M 3/10; H02M 3/145; H02M 3/155; H02M 3/156; H02M 3/157; H02M 3/158; H02M 3/1584; H02M 3/337; H02M 3/3372; H02M 3/3374; H02M 3/3376; H02M 3/3378; H02M 3/338; H02M 3/3381; H02M 3/3382; H02M 3/3384; H02M 3/33845; H02M 3/3387; H02M 3/3388

See application file for complete search history.

(56) References Cited

U.S. PATENT DOCUMENTS

| | | | |
|---|---|---|---|
| 2007/0223289 A1* | 9/2007 | Lee | G11C 16/12 365/189.11 |
| 2008/0174360 A1* | 7/2008 | Hsu | H02M 3/073 327/536 |
| 2010/0239616 A1 | 9/2010 | Hafezi et al. | |
| 2013/0235669 A1* | 9/2013 | Maglione | G11C 5/147 365/185.18 |
| 2014/0300409 A1* | 10/2014 | Emira | H02M 3/07 327/536 |
| 2015/0149795 A1 | 5/2015 | Watanabe | |
| 2018/0061500 A1* | 3/2018 | Hioka | G11C 7/1063 |
| 2018/0315989 A1 | 11/2018 | Yoshida et al. | |

FOREIGN PATENT DOCUMENTS

| | | |
|---|---|---|
| JP | 2010148263 A | 7/2010 |
| JP | 2015126595 A | 7/2015 |
| JP | 2017041922 A | 2/2017 |
| JP | 2017120684 A | 7/2017 |
| JP | 2018027014 A | 2/2018 |

* cited by examiner

INDIVIDUAL STEP-UP CIRCUIT, STEP-UP CIRCUIT, AND ELECTRONIC APPARATUS

CROSS-REFERENCE TO RELATED APPLICATIONS

This application is a U.S. National Stage entry of PCT Application No: PCT/JP2019/033311 filed on Aug. 26, 2019, which claims priority to Japanese Patent Application No. 2018-159617 filed Aug. 28, 2018, the contents of which are incorporated herein by reference.

TECHNICAL FIELD

The present invention relates to an individual boost circuit, a boost circuit using the individual boost circuit, and an electronic device on which the boost circuit is mounted.

BACKGROUND ART

PTL 1 discloses various types of charge pump circuits (boost circuits). In any of charge pump circuits, individual boost circuits at a plurality of stages are connected in series. In the charge pump circuit, through ON and OFF operations performed with clock voltages of one switching transistor or a plurality of switching transistors (charge transfer switches) in the individual boost circuit at each stage, charging of pump capacitors (boost capacitors), boosting of charging voltages of the pump capacitors with clock voltages, and further transferring of the boosted voltages from the pump capacitors to the boost circuit at the subsequent stage are repeatedly performed in sequence. Thus, the charging voltages in the pump capacitors in the individual boost circuit at each stage gradually are increased in sequence at the subsequent stages from an input voltage VIN by the charge pump circuits, a voltage higher than the input voltage VIN is accumulated (stored) in the pump capacitors in the individual boost circuit at the final stage. In an electronic device in which the charge pump circuit (a boost circuit) is mounted, a charging voltage of the pump capacitor in the individual boost circuit at the final stage can be used as a power voltage.

In the charge pump circuit (the boost circuit), the charging voltage can be boost without using a coil or the like. In general, the charge pump circuit can be miniaturized, which results in contribution to miniaturization of the electronic device.

CITATION LIST

Patent Literature

[PTL 1] Japanese Patent Application Publication No. 2015-126595

SUMMARY OF THE INVENTION

Technical Problem

Meanwhile, small electronic devices (swallow type devices) which can be taken into the bodies of animals such as people have been proposed (for example, Publication number of Japanese Translation of PCT Application No. 2010-508293). As powers of the small electronic devices, for example, it has been proposed to use a Borda battery (hereinafter referred to as a gastric acid battery) that uses a gastric juice (a gastric acid) as an electrolyte and includes two electrodes (for example, Japanese Patent Application Publication No. 2017-120684). Because an output voltage of a gastric acid battery is minute (for example, 1.3 V), it is conceivable to boost a voltage generated by the gastric acid battery using the above-described charge pump circuit (the boost circuit) to obtain a power voltage with magnitude (for example, 3 V to 6 V) appropriate for an operation voltage in the small device including an operation circuit operating at a relatively high voltage.

It is conceivable to operate an electronic device in which the gastric acid battery is mounted not only inside a stomach but also in other organs with no gastric acid which is an electrolyte, for example, an intestine. In this case, further, it is necessary to accumulate (store) a voltage obtained by boosting a charge pump circuit (a boost circuit) in a capacitor. Therefore, while an electronic device is in a stomach, it is important to boost a voltage generated by a gastric acid battery to a target voltage as early as possible and accumulate (store) a voltage obtained through the boosting in a capacitor.

As described above, when it is assumed that boost circuit (the charge pump circuit) including individual boost circuits at a plurality of stages are mounted in small electronic devices (swallow type devices) which are taken into the bodies of animals such as people and operate, it is important to miniaturize boost circuits and reliably boost voltages to target voltages in each of the individual boost circuits at the plurality of stages included in the boost circuit.

The present invention has been devised in view of the above-described circumstances and provides an individual boost circuit capable of boosting a minute power voltage to a target voltage more reliably.

The present invention provides a boost circuit which can be miniaturized using a plurality of individual boost circuits and obtain an output voltage which is a final target more reliably from a minute power voltage.

The present invention provides an electronic device in which the boost circuit is mounted and can reliably operate.

Solution to Problem

According to an aspect of the present invention, an individual boost circuit includes: a first switching transistor configured to operate in synchronization with a first clock voltage changed between a high voltage value and a low voltage value lower than the high voltage value, enters an off-state when the first clock voltage is the high voltage value, and enters an on-state when the first clock voltage is the low voltage value; a second switching transistor configured to operate in synchronization with a second clock voltage that has a reciprocal relation with the first clock voltage, enters an off-state when the second clock voltage is the high voltage value, and enters an on-state when the second clock voltage is the low voltage value; an auxiliary capacitor; an auxiliary charging circuit configured to charge the auxiliary capacitor with a supplied voltage via the second switching transistor when the first switching transistor is in the off-state and the second switching transistor is in the on-state; and a boost charging circuit configured to supply a voltage to a circuit at a subsequent stage via the first switching transistor by a voltage corresponding to the second clock voltage through the auxiliary capacitor charged with the supplied voltage when the first switching transistor is in the on-state and the second switching transistor is in the off-state.

In this configuration, when the first clock voltage is the high voltage value, the second clock voltage is the low voltage value, the first switching transistor enters the off-state, and the second switching transistor enters the on-state. In this state, the auxiliary charging circuit charges the auxiliary capacitor with the supplied voltage via the second switching transistor in the on-state. On the other hand, when the first clock voltage is the low voltage value and the second clock voltage is the high voltage value, the first switching transistor enters the on-state and the second switching transistor enters the off-state. In this state, the boost charging circuit supplies the voltage to the circuit at the subsequent stage via the first switching transistor in the on-state by the voltage corresponding to the second clock voltage (the high voltage value) through the auxiliary capacitor which has already been charged with the supplied voltage.

Then, during the repetition of the first and second clock voltages that have the reciprocal relation between the high and low voltage values, the supplied voltage to the auxiliary capacitor through the above-described on- and off-operations of the first switching transistor and the on- and off-operations of the second switching transistor reciprocal to the on- and off-operations of the first switching transistor and the voltage supply to the circuit at the subsequent stage by the voltage corresponding to the second clock voltage (the high voltage value) through the charged auxiliary capacitor are alternately repeated. Thus, when the boost capacitor is connected to the circuit at the subsequent stage, the charging voltage is gradually increased (boosted).

The voltage corresponding to the second clock voltage with which the boost charging circuit charges the boost capacitor may be the second clock voltage (the high voltage value) or may be another clock voltage for providing a voltage value corresponding to the high voltage value of the second clock voltage at a charging timing of the boost capacitor rather than the second clock voltage.

In the individual boost circuit according to the aspect of the present invention, the first switching transistor may be a first PMOS transistor with a gate to which the first clock voltage is applied. The second switching transistor may be a second PMOS transistor with a gate to which the second clock voltage is applied.

In a general manufacturing technology for complementary MOS (CMOS), a circuit is manufactured on a p-type substrate. When the transistors are configured as NMOS transistors, a substrate effect is unavoidable. However, in this configuration, the first and second switching transistors are PMOS transistors formed in n-wells in a p-type substrate. Therefore, when the substrate effect can be inhibited, reliable on- and off-operations can be performed with a minute clock voltage. Because the transistors are configured as only the PMOS transistors, the advantage can be obtained in that a circuit on which the substrate effect has no influence can be configured without an increase in processing cost.

It is important to inhibit the substrate effect because it is necessary to control a small electronic device such as a swallow type device using a minute clock voltage.

In the individual boost circuit according to the aspect of the present invention, a source of the first PMOS transistor may be connected to the circuit at the subsequent stage. A source of the second PMOS transistor may be connected to the auxiliary capacitor and is connected to a drain of the first PMOS transistor. A drain of the second PMOS transistor may be connected to a power of the supplied voltage. The auxiliary charging circuit may include a circuit starting from the power, passing the drain of the second PMOS transistor to the source of the second PMOS transistor, and reaching the auxiliary capacitor. The boost charging circuit may include a circuit starting from the auxiliary capacitor, passing the drain of the first PMOS transistor to the source of the first PMOS transistor, and reaching the circuit at the subsequent stage.

In this configuration, when the first clock voltage is the high voltage value, the first PMOS transistor is in the off-state, the second clock voltage is the low voltage value, and the second PMOS transistor is in the on-state, the circuit (the auxiliary charging circuit) starting from the power of the supplied voltage, passing the drain of the second PMOS transistor to the source of the second PMOS transistor, and reaching the auxiliary capacitor charges the auxiliary capacitor via the second PMOS transistor with the supplied voltage. On the other hand, when the first clock voltage is the low voltage value, the first PMOS transistor is in the on-state, the second clock voltage is the high voltage value, and the second PMOS transistor is in the off-state, the circuit at the subsequent stage, for example, the circuit (the boost charging circuit) starting from the auxiliary capacitor, passing the drain of the first PMOS transistor to the source of the first PMOS transistor, and reaching the boost capacitor charges the boost capacitor via the first PMOS transistor with the voltage corresponding to the second clock voltage (the high voltage value) through the auxiliary capacitor which has already been charged.

The individual boost circuit according to the aspect of the present invention may further include a circuit configured to apply the second clock voltage to the gate of the second PMOS transistor through the auxiliary capacitor.

In this configuration, both the on- and off-operations of the second PMOS transistor by the second clock voltage and the charging of the boost capacitor with the second clock voltage (the high voltage value) via the first PMOS transistor can be performed through the auxiliary capacitor.

The individual boost circuit according to the aspect of the present invention may further include a first clock buffer circuit configured to generate, from a first reference clock voltage, a clock voltage applied as the first clock voltage to the gate of the first PMOS transistor; and a second clock buffer circuit configured to generate, from a second reference clock voltage that has a reciprocal relation with the first reference clock voltage, a clock voltage applied as the second clock voltage to the gate of the second PMOS transistor.

In this configuration, it is possible to reliably perform the operations of turning the first PMOS transistor on and off by causing the first clock buffer circuit to reinforce the clock voltage generated as the first clock voltage from the first reference clock voltage, and it is possible to reliably perform the operations of turning the second PMOS transistor on and off by causing the second clock buffer circuit to reinforce the clock voltage generated as the second clock voltage from the second reference clock voltage that has the reciprocal relation with the first reference clock voltage. As a result, it is possible to reliably perform boosting from the power voltage.

According to another aspect of the present invention, an individual boost circuit includes: a first PMOS transistor; a second PMOS transistor; an auxiliary capacitor; and a circuit at a subsequent stage. A source of the first PMOS transistor is connected to the circuit at the subsequent stage. A gate and a source of the second PMOS transistor are connected to a second auxiliary capacitor and are connected to a drain of the first PMOS transistor. The drain of the second PMOS transistor is connected to a power of a supplied voltage. The gate of the first PMOS transistor and the auxiliary capacitor are respectively connected to first and second clock voltages that have a reciprocal relation.

In this configuration, it is possible to inhibit the above-described substrate effect and thus obtain the individual boost circuit capable of performing boosting.

In the individual boost circuit according to the aspect of the present invention, an n-well in a p-type substrate of the first PMOS transistor may be connected to the circuit at the subsequent stage. An n-well in a p-type substrate of the second PMOS transistor may be connected to the capacitor.

In this configuration, the n-well in the p-type substrate of each PMOS transistor is connected to a position at which a potential is the highest in the unit in the circuit. By connecting the n-well in this way, it is possible to remove a junction leakage and it is possible to reliably perform an operation of the PMOS transistor as the switching transistor.

According to still another aspect of the present invention, an individual boost circuit includes first and fourth switching transistors configured to operate in synchronization with a first clock voltage changed between a high voltage value and a low voltage value lower than the high voltage value, enters an off-state when the first clock voltage is the high voltage value, and enters an on-state when the first clock voltage is the low voltage value; second and third switching transistors configured to operate in synchronization with a second clock voltage that has a reciprocal relation with the first clock voltage, enters an off-state when the second clock voltage is the high voltage value, and enters an on-state when the second clock voltage is the low voltage value; a first auxiliary capacitor; a second auxiliary capacitor; a first auxiliary charging circuit configured to charge the first auxiliary capacitor with a supplied voltage via the fourth switching transistor when the second switching transistor is in the off-state and the fourth switching transistor is in the on-state; a first boost charging circuit configured to supply a voltage to a circuit at a subsequent stage via the second switching transistor by a voltage corresponding to the first clock voltage through the first auxiliary capacitor charged with the supplied voltage when the second switching transistor is in the on-state and the fourth switching transistor is in the off-state; a second auxiliary charging circuit configured to charge the second auxiliary capacitor with the supplied voltage via the third switching transistor when the first switching transistor is in the off-state and the third switching transistor is in the on-state; and a second boost charging circuit configured to supply a voltage to the circuit at the subsequent stage via the first switching transistor by a voltage corresponding to the second clock voltage through the second auxiliary capacitor charged with the supplied voltage when the first switching transistor is in the on-state and the third switching transistor is in the off-state.

In this configuration, when the first clock voltage is the high voltage value, the second clock voltage that has the reciprocal relation with the first clock voltage is the low voltage value, the first and fourth switching transistors enter the off-state, and the second and third switching transistors enter the on-state. In this state, the second auxiliary charging circuit charges the second auxiliary capacitor with the supplied voltage via the third switching transistor in the on-state. Simultaneously, the first boost charging circuit supplies the voltage to the circuit at the subsequent stage via the second switching transistor in the on-state by the voltage corresponding to the first clock voltage (the high voltage value) through the first auxiliary capacitor which has already been charged.

On the other hand, when the first clock voltage is the low voltage value and the second clock voltage is the high voltage value, the first and fourth switching transistors enter the on-state and the second and third switching transistors enter the off-state. In this state, the first auxiliary charging circuit charges the first auxiliary capacitor discharged for the circuit at the subsequent stage with the supplied voltage via the fourth switching transistor in the on-state. Simultaneously, the second boost charging circuit supplies the voltage to the circuit at the subsequent stage via the first switching transistor in the on-state by the voltage corresponding to the second clock voltage (the high voltage value) through the second auxiliary capacitor which has already been charged with the supplied voltage.

As described above, during the repetition of the first and second clock voltages that have the reciprocal relation between the high and low voltage values, the on- and off-operations of the first and fourth switching transistors and the on- and off-operations of the second and third switching transistors reciprocal to the on- and off-operations of the first and fourth switching transistors are performed. The charging of the second auxiliary capacitor with the supplied voltage through the above-described on- and off-operations of the first to fourth switching transistors, the voltage supply to the circuit at the subsequent stage by the voltage corresponding to the first clock voltage (the high voltage value) through the charged first auxiliary capacitor, the charging of the discharged first auxiliary capacitor with the supplied voltage, and the voltage supply to the circuit at the subsequent stage by the voltage corresponding to the second clock voltage (the high voltage value) through the charged second auxiliary capacitor are alternately repeated. Thus, when the boost capacitor is connected to the circuit at the subsequent stage, the charging voltage is gradually increased (boosted). In particular, when one of the first and second auxiliary capacitors alternately charged with the supplied voltage is charged, the charging of the boost capacitor from the other auxiliary capacitor which has already been charged is performed. Therefore, it is possible to efficiently increase (boost) the charging voltage of the boost capacitor.

The voltage corresponding to the first clock voltage by which the first boost charging circuit supplies the voltage to the circuit at the subsequent stage may be the first clock voltage (the high voltage value) or may be another clock voltage for providing a voltage value corresponding to the high voltage value of the first clock voltage at a timing at which the voltage is supplied to the circuit at the subsequent stage rather than the first clock voltage. The same applies to the voltage corresponding to the second clock voltage by which the second boost charging circuit supplies the voltage to the circuit at the subsequent stage.

In the individual boost circuit according to the aspect of the present invention, the first switching transistor may be a first PMOS transistor with a gate to which the first clock voltage is applied, the second switching transistor may be a second PMOS transistor with a gate to which the second clock voltage is applied, the third switching transistor may be a third PMOS transistor with a gate to which the second clock voltage is applied, and the fourth switching transistor may be a fourth PMOS transistor with a gate to which the first clock voltage is applied.

In this configuration, because each of the first to fourth switching transistors is the PMOS transistor formed in the n-well in the p-type substrate, as described above, it is possible to inhibit the substrate effect and thus reliably perform the on- and off-operations even with a minute clock voltage.

In the individual boost circuit according to the aspect of the present invention, a source of the first PMOS transistor may be connected to the circuit at the subsequent stage. A source of the second PMOS transistor may be connected to the circuit at the subsequent stage. A source of the third PMOS transistor may be connected to the second auxiliary capacitor and connected to a drain of the first PMOS transistor. A source of the fourth PMOS transistor may be connected to the first auxiliary capacitor and connected to a drain of the second PMOS transistor. The first auxiliary charging circuit may include a circuit starting from the power of the supplied voltage, passing the drain of the fourth PMOS transistor to the source of the fourth PMOS transistor, and reaching the first auxiliary capacitor. The second auxiliary charging circuit may include a circuit starting from the power, passing the drain of the third PMOS transistor to the source of the third PMOS transistor, and reaching the second auxiliary capacitor. The first boost charging circuit may include a circuit starting from the first auxiliary capacitor, passing the drain of the second PMOS transistor to the source of the second PMOS transistor, and reaching the circuit at the subsequent stage. The second boost charging circuit may include a circuit starting from the second auxiliary capacitor, passing the drain of the first PMOS transistor to the source of the first PMOS transistor, and reaching the circuit at the subsequent stage.

In this configuration, when the first and fourth PMOS transistors are in the off-state at the first clock voltage which is the high voltage value and the second and third PMOS transistors are in the on-state at the second clock voltage which is the low voltage value, the circuit (the second auxiliary charging circuit) starting from the power of the supplied voltage, passing the drain of the third PMOS transistor to the source of the third PMOS transistor, and reaching the second auxiliary capacitor charges the second auxiliary capacitor via the third PMOS transistor with the supplied voltage. Simultaneously, the circuit (the first boost charging circuit) starting from the first auxiliary capacitor, passing the drain of the second PMOS transistor to the source of the second PMOS transistor, and reaching the circuit at the subsequent stage supplies the voltage to the circuit at the subsequent stage by the voltage corresponding to the first clock voltage (the high voltage value) via the second PMOS transistor through the first auxiliary capacitor that has already been charged.

On the other hand, when the first and fourth PMOS transistors are in the on-state at the first clock voltage which is the low voltage value and the second and third PMOS transistors are in the off-state at the second clock voltage which is the high voltage value, the circuit (the first auxiliary charging circuit) starting from the power of the supplied voltage, passing the drain of the fourth PMOS transistor to the source of the fourth PMOS transistor, and reaching the first auxiliary capacitor charges the first auxiliary capacitor discharged to supply the voltage to the circuit at the subsequent stage via the fourth PMOS transistor with the supplied voltage. Simultaneously, the circuit (the second boost charging circuit) starting from the second auxiliary capacitor, passing the drain of the first PMOS transistor to the source of the first PMOS transistor, and reaching the boost capacitor supplies the voltage to the circuit at the subsequent stage by the voltage corresponding to the second clock voltage (the high voltage value) via the first PMOS transistor through the second auxiliary capacitor that has already been charged with the supplied voltage.

The individual boost circuit according to the aspect of the present invention may further include a circuit configured to apply the first clock voltage to the gate of the first PMOS transistor and the gate of the fourth PMOS transistor through the first auxiliary capacitor.

In this configuration, both the on- and off-driving of the first and fourth PMOS transistors by the first clock voltage and the voltage supply to the circuit at the subsequent stage by the first clock voltage (the high voltage value) via the second PMOS transistor can be performed through the first auxiliary capacitor.

The individual boost circuit according to the aspect of the present invention may further include a circuit configured to apply the second clock voltage to the gate of the second PMOS transistor and the gate of the third PMOS transistor through the second auxiliary capacitor.

In this configuration, both the on- and off-driving of the second and third PMOS transistors by the second clock voltage and the voltage supply to the circuit at the subsequent stage by the second clock voltage (the high voltage value) via the first PMOS transistor can be performed through the second auxiliary capacitor.

The individual boost circuit according to the aspect of the present invention may further include a first clock buffer circuit configured to generate, from a first reference clock voltage, a clock voltage applied as the first clock voltage to the gate of the first PMOS transistor; a second clock buffer circuit configured to generate, from the first reference clock voltage, a clock voltage applied as the second clock voltage to the gate of the third PMOS transistor; a third clock buffer circuit configured to generate, from a second reference clock voltage that has a reciprocal relation with the first reference clock voltage, a clock voltage applied as the second clock voltage to the gate of the second PMOS transistor; and a fourth clock buffer circuit configured to generate, from the second reference clock voltage, a clock voltage applied as the first clock voltage to the gate of the fourth PMOS transistor.

In this configuration, the on- and off-driving of the first and third PMOS transistors can be reliably performed by two clock voltages which are the first and second clock voltages that have the reciprocal relation and are generated from the first reference clock voltage by the first and second clock buffer circuits. In addition, the on- and off-driving of the second and fourth PMOS transistors can be reliably performed by two clock voltages which are the first and second clock voltages that have the reciprocal relation and are generated from the second reference clock voltage that has the reciprocal relation with the first reference clock voltage by the third and fourth clock buffer circuits. As a result, it is possible to reliably perform boosting from the supplied voltage.

In the individual boost circuit according to the aspect of the present invention, the first boost charging circuit may include a circuit that supplies a voltage to the circuit at the subsequent stage via the second PMOS transistor by the first reference clock voltage through the first auxiliary capacitor charged with the supplied voltage.

In this configuration, the voltage is supplied via the second PMOS transistor to the circuit at the subsequent stage through the first auxiliary capacitor by the first reference clock voltage (the high voltage value) which is the voltage corresponding to the first clock voltage.

In the boost circuit according to the aspect of the present invention, the second boost charging circuit may include a circuit that supplies a voltage to the circuit at the subsequent stage via the first PMOS transistor by the second reference clock voltage through the second auxiliary capacitor charged with the supplied voltage.

In this configuration, the voltage is also supplied via the first PMOS transistor to the circuit at the subsequent stage through the second auxiliary capacitor by the second reference clock voltage (the high voltage value) which is the voltage corresponding to the second clock voltage.

According to still another aspect of the present invention, an boost circuit includes: a first PMOS transistor; a second PMOS transistor; a third PMOS transistor; a fourth PMOS transistor; a first auxiliary capacitor; and a second auxiliary capacitor. A source of the first PMOS transistor is connected to a circuit at a subsequent stage. A source of the second PMOS transistor is connected to the circuit at the subsequent stage. A gate and a source of the third PMOS transistor are connected to a gate of the second PMOS transistor and the second auxiliary capacitor and are connected to a drain of the first PMOS transistor. A source of the fourth PMOS transistor is connected to a gate of the first PMOS transistor and the first auxiliary capacitor and is connected to a drain of the second PMOS transistor. A drain of the third PMOS transistor and a drain of the fourth PMOS transistor are connected to a power of a supplied voltage. The first and second auxiliary capacitors are respectively connected to the first and second clock voltages that have a reciprocal relation.

In this configuration, it is possible to inhibit the above-described substrate effect and thus obtain the boost circuit capable of performing boosting.

In the individual boost circuit according to the aspect of the present invention, an n-well of a p-type substrate of the first PMOS transistor may be connected to the circuit at the subsequent stage. An n-well of a p-type substrate of the second PMOS transistor may be connected to the circuit at the subsequent stage. An n-well of a p-type substrate of the third PMOS transistor may be connected to the second auxiliary capacitor. An n-well of a p-type substrate of the fourth PMOS transistor may be connected to the first auxiliary capacitor.

In this configuration, the n-well in the p-type substrate of each PMOS transistor is connected to a position at which a potential is the highest in the unit in the circuit. By connecting the n-well in this way, it is possible to remove a junction leakage and it is possible to reliably perform an operation of the PMOS transistor as the switching transistor.

According to still another aspect of the present invention, a boost circuit includes individual boost circuits at a plurality of stages connected in series. Each of the individual boost circuits at the plurality of stages includes any of the individual boost circuit including the above-described two switching transistors (the first and second switching transistors). A power voltage of an external power is input to the individual boost circuit at a first stage as the supplied voltage and a charged voltage to the circuit at the subsequent stage in the individual boost circuit at a preceding stage is input to the individual boost circuit at each stage other than the first stage as the supplied voltage.

In this configuration, when the circuit at the subsequent stage in the individual boost circuit at each stage is provided with, for example, the boost capacitor, the voltage kept in the charging of the boost capacitor can be gradually increased (boosted) from the power voltage of an external power. Then, the voltage kept in the charging of the boost capacitor in the individual boost circuit at the final stage can be used as the output voltage of the boost circuit.

In the boost circuit according to the aspect of the present invention, each of the individual boost circuits at the plurality of stages may include, in particular, the above-described first and second clock buffer circuits. A clock voltage from the first clock buffer circuit in the individual boost circuit at a preceding stage is input to the first clock buffer circuit of the individual boost circuit at each stage other than the first stage as the first reference clock voltage. A clock voltage from the second clock buffer circuit in the individual boost circuit at a preceding stage is input to the second clock buffer circuit of the individual boost circuit at each stage other than the first stage as the second reference clock voltage.

In this configuration, in the individual boost circuits at the plurality of stages, the first clock buffer circuit at the preceding stage reinforces the first reference clock voltage which is a basis of a clock voltage serving as the first clock voltage for performing the operations of turning the first PMOS transistor on and off. The second clock buffer circuit at the preceding stage reinforces the second reference clock voltage which is a basis of a clock voltage serving as the second clock voltage for performing the operations of turning the second PMOS transistor on and off. Therefore, it is possible to reliably turn the first and second PMOS transistors in the individual boost circuit at each stage on and off more reliably.

According to still another aspect of the present invention, a boost circuit includes individual boost circuits at a plurality of stages connected in series. Each of the individual boost circuits at the plurality of stages may include any of the individual boost circuit including the above-described four switching transistor (the first, second, third, and fourth switching transistors). A power voltage of an external power is input to the individual boost circuit at a first stage as the supplied voltage and a charged voltage to the circuit at the subsequent stage in the individual boost circuit at a preceding stage is input to the individual boost circuit at each stage other than the first stage as the supplied voltage.

In this configuration, as in the above-described boost circuit, when the circuit at the subsequent stage in the individual boost circuit at each stage is provided with, for example, the boost capacitor, the voltage kept in the charging of the boost capacitor can be gradually increased (boosted) from the power voltage of the external power. The voltage kept in the charging of the boost capacitor in the individual boost circuit at the final stage can be used as the output voltage of the boost circuit.

In the boost circuit according to the aspect of the present invention, each of the individual boost circuits at the plurality of stages may include a boost circuit including, in particular, the above-described first to fourth clock buffer circuits. A clock voltage from the first clock buffer circuit in the individual boost circuit at a preceding stage is input to the first and second clock buffer circuits of the individual boost circuit at each stage other than the first stage as the first reference clock voltage. A clock voltage from the third clock buffer circuit in the individual boost circuit at a preceding stage is input to the third and fourth clock buffer circuits of the individual boost circuit at each stage other than the first stage as the second reference clock voltage.

In this configuration, in the individual boost circuits at the plurality of stages, the first clock buffer circuit at the preceding stage reinforces the clock voltage serving as the first clock voltage for performing the operations of turning the first PMOS transistor on and off and the first reference clock voltage which is a basis of the clock voltage serving as the second clock voltage for performing the operations of turning the third PMOS transistor on and off. The third clock buffer circuit at the preceding stage reinforces the clock voltage serving as the second clock voltage for performing the operations of turning the second PMOS transistor on and off and the second reference clock voltage which is a basis of the clock voltage serving as the first clock voltage for performing the operations of turning the fourth PMOS transistor on and off. Therefore, it is possible to reliably turn the first to fourth PMOS transistors in the individual boost circuit at each stage on and off more reliably.

According to still another aspect of the present invention, an electronic device includes: a boost circuit including any of the above-described individual boost circuit or any of the above-described boost circuit; and an operation circuit configured to operate when a voltage is supplied from the boost circuit.

In this configuration, the operation circuit for which a higher supplied voltage is necessary operates using an external power of a minute power voltage.

Advantageous Effects of Invention

According to the present invention, the individual boost circuit alternately repeats the charging of the auxiliary capacitor with the power voltage and the charging of the boost capacitor with the voltage corresponding to the second clock voltage through the charged auxiliary capacitor. Thus, because the charging voltage of the boost capacitor is gradually increased to reach a target voltage, the charging voltage can be more reliably boosted to the target voltage from a minute supplied voltage.

According to the present invention, the individual boost circuit alternately repeats the charging of the second auxiliary capacitor with the supplied voltage and the charging of the boost capacitor with the voltage corresponding to the first clock voltage through the first auxiliary capacitor which has already been charged, and the charging of the discharged first auxiliary capacitor with the supplied voltage and the charging of the boost capacitor to correspond to the second clock voltage through the second auxiliary capacitor which has already been charged. Thus, because the charging voltage of the boost capacitor is gradually increased to reach a target voltage, the charging voltage can be more reliably boosted to the target voltage from a minute power voltage. Because the charging of the boost capacitor from two systems, the first and second auxiliary capacitors, is alternately performed, it is possible to boost the charging voltage of the boost capacitor more efficiently.

According to the present invention, because the boost circuit can reliably boost each of the individual boost circuits at the plurality of stages to the target voltage, it is possible to reliably obtain the output voltage which is a final target from the minute power voltage, and reduce or remove the individual boost circuits in which a loss is considered for miniaturization.

According to the present invention, because the boost circuit capable of reliably obtaining the output voltage which is the final target from the minute power voltage is mounted in the electronic device, a reliable operation can be performed with the output voltage.

DESCRIPTION OF EMBODIMENTS

Hereinafter, embodiments of the present invention will be described with reference to the drawings.

Figure 1:
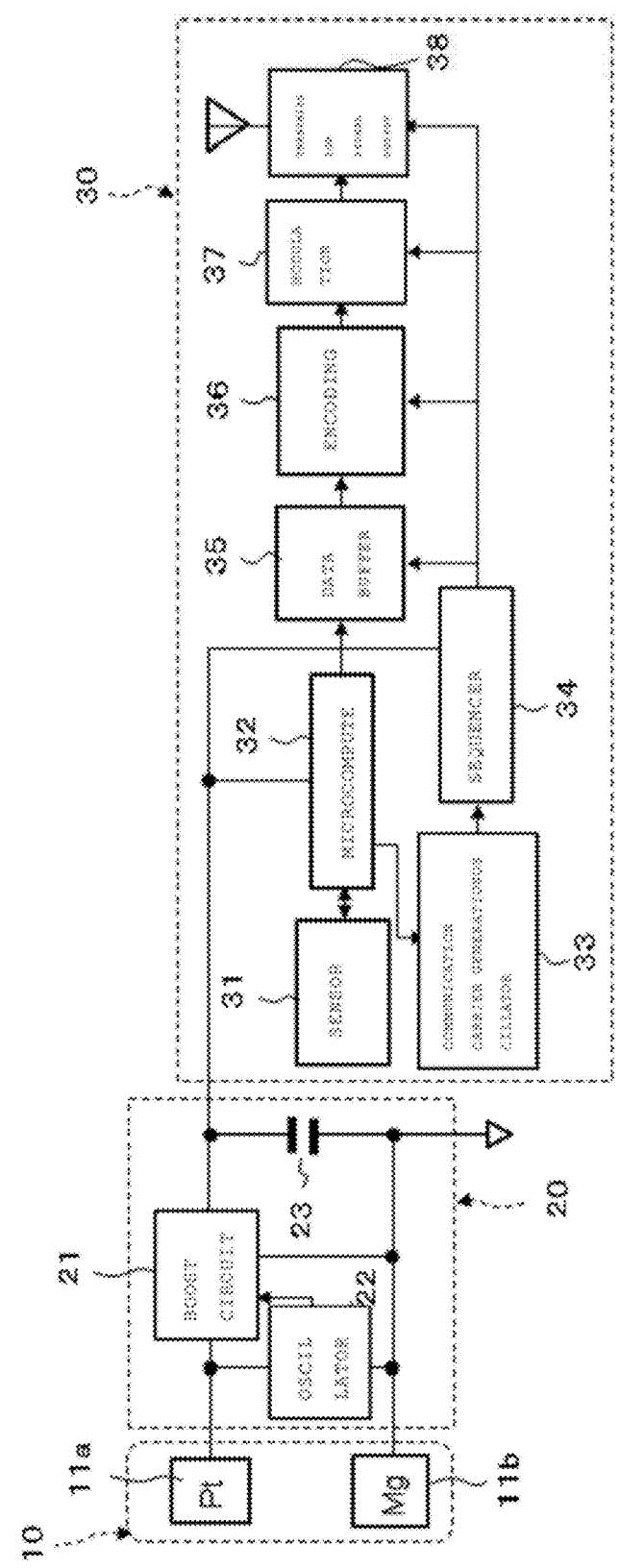
FIG. 1 is a block diagram illustrating a configuration of an electronic device according to an embodiment of the present invention.

An electronic device in which a boost circuit according to the embodiment of the present invention is mounted is configured, as illustrated in FIG. 1. The electronic device is a so-called swallow type device that is taken into the body of an animal such as a person and operates.

In FIG. 1, the electronic device (the swallow type device) includes a power unit 20 and an operation circuit 30 that operates when power is fed from the power unit 20. In the power unit 20, a Pt (platinum) electrode 11a and a Mg (magnesium) electrode lib included in a gastric acid battery (an external power) 10 are connected and a voltage (a power voltage from the external power) generated between the Pt electrode (a positive electrode) 11a and the Mg electrode (a negative electrode) lib in gastric juice (gastric acid) is boosted and supplied to the operation circuit 30. The power unit 20 includes a boost circuit 21, an oscillator 22, and a storage capacitor 23. As will be described below in detail, the boost circuit 21 includes individual boost circuits at a plurality of stages connected in series and boosts a minute voltage generated between the Pt electrode 11a and the Mg electrode lib of the gastric acid battery 10 in sequence in synchronization with two clock voltages that has a reciprocal relation from the oscillator 22. A voltage obtained in the individual boost circuit at the final stage of the boost circuit 21 is accumulated (stored) in the storage capacitor 23. The voltage stored in the storage capacitor 23 in the power unit 20 is applied as a power voltage from the power unit 20 to the operation circuit 30.

The operation circuit 30 is an electronic circuit that is fed with power from the power unit 20 (including the boost circuit 21), acquires, for example, various kinds of biometric information regarding an organ of an animal, and operates of transmitting the information outside of the body. The operation circuit 30 includes a sensor 31, a microcomputer 32, a communication carrier generation oscillator 33, a sequencer 34, a data buffer 35, an encoder 36, a modulator 37, and a transmission signal output unit (transmitter) 38. The description of the detailed configuration and an operation of each unit of the operation circuit 30 will be omitted.

The configuration of the above-described boost circuit 21 which is a boost circuit according to the first embodiment of the present invention will be described in detail with reference to FIGS. 2, 3A, and 3B.

Figure 2:
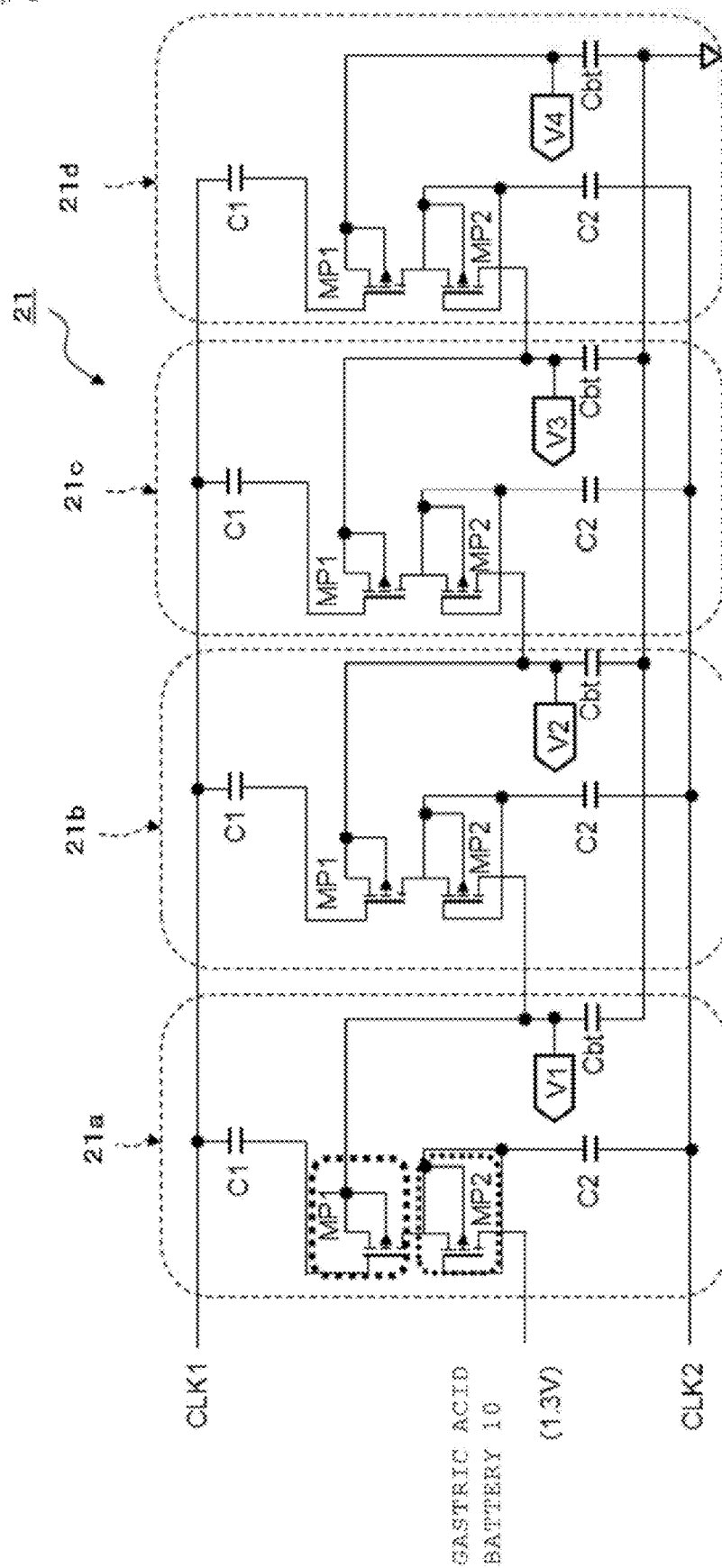
FIG. 2 is a circuit diagram illustrating a boost circuit according to a first embodiment of the present invention used for the electronic device illustrated in FIG. 1.

In the boost circuit 21, as illustrated in FIG. 2, individual boost circuits 21a, 21b, 21c, and 21d at a plurality of stages (in this case, four stages) are connected in series. The oscillator 22 (see FIG. 1) supplies each of the individual boost circuits 21a, 21b, 21c, and 21d with a first clock voltage CLK1 ($V_{CLK1}$) changed between a high voltage value and a low voltage value lower than the high voltage value and a second clock voltage CLK2 ($V_{CLK2}$) that has a reciprocal relation with the first clock voltage CLK1 ($V_{CLK1}$). Each of the individual boost circuits 21a, 21b, 21c, and 21d operates in synchronization with the first clock voltage CLK1 ($V_{CLK1}$) and the second clock voltage CLK2 ($V_{CLK2}$).

Figure 3A:
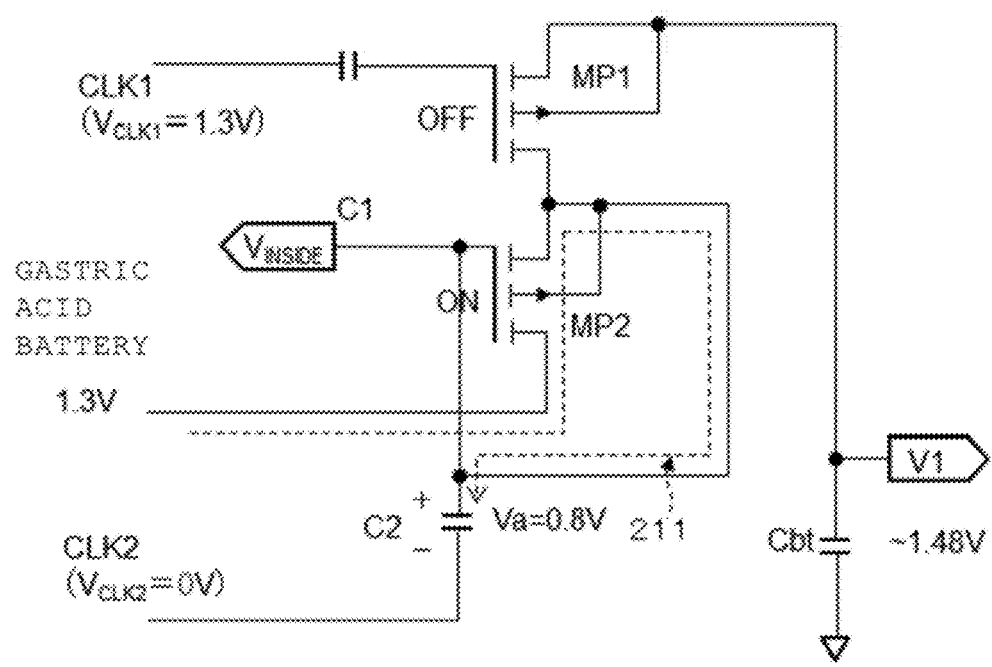
FIG. 3A is a circuit diagram (part 1) illustrating an individual boost circuit at a first stage in the boost circuit illustrated in FIG. 2.
Figure 3B:
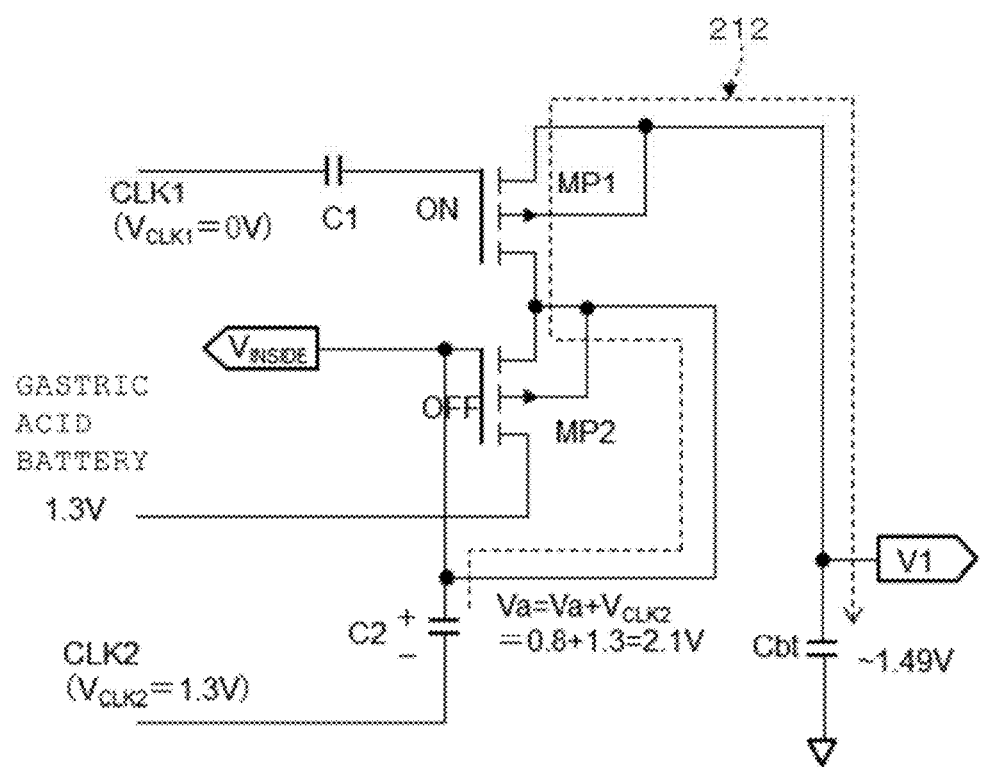
FIG. 3B is a circuit diagram (part 2) illustrating the individual boost circuit at the first stage in the boost circuit illustrated in FIG. 2.

The individual boost circuit 21a at the first stage includes a first PMOS transistor MP1 (a first switching transistor), a second PMOS transistor MP2 (a second switching transistor), a first capacitor C1, a second capacitor C2 (an auxiliary capacitor), and a boost capacitor Cbt, as illustrated in FIGS. 2, 3A, and 3B. The individual boost circuit 21a at the first stage is supplied with an output voltage (a power voltage: for example, 1.3 V) from the gastric acid battery 10 as a supplied voltage in addition to the first clock voltage CLK1 ($V_{CLK1}$) and the second clock voltage CLK2 ($V_{CLK2}$). Although the first capacitor C1 is provided for circuit stabilization, the first capacitor C1 is not an essential constituent element because there is no operational problem even when the first capacitor C1 is not provided. Here, the first capacitor C1 is assumed to be provided in the description.

A connection point between a source and an n-well in a p-type substrate of the first PMOS transistor MP1 is connected to one end of the boost capacitor Cbt of which the other end is grounded. In the present invention, the n-well is formed in a region surrounded by a thick dotted line of FIG. 2 in the p-type substrate. The n-well (in FIG. 2, only the first stage is illustrated for simplicity, but the n-well is formed at the subsequent stages in this way) is electrically isolated (insulated) from the other n-wells. In the present invention, a side connected to the n-well in the p-type substrate is referred to as a source. In the circuit according to the present invention, a source side and a drain side of the PMOS are not essential but are named to facilitate understanding. A connection point between a source and an n-well in a p-type substrate of the second PMOS transistor MP2 is connected to one end of a second capacitor C2 and is connected to a drain of the first PMOS transistor MP1. One end of the first capacitor C1 is connected to a gate of the first PMOS transistor MP1 and the first clock voltage CLK1 ($V_{CLK1}$) is input to the other end of the first capacitor C1. Accordingly, the first clock voltage CLK1 ($V_{CLK1}$) is applied to the gate of the first PMOS transistor MP1 through the first capacitor C1. One end of the second capacitor C2 to which the connection point between the source and the n-well in the p-type substrate of the above-described second PMOS transistor MP2 is connected is connected to the gate of the second PMOS transistor MP2, and the second clock voltage CLK2 ($V_{CLK2}$) is input to the other end of the second capacitor C2. Accordingly, the second clock voltage CLK2 ($V_{CLK2}$) is applied to the gate of the second PMOS transistor MP2 via the second capacitor C2.

The n-well in the p-type substrate of the first PMOS transistor MP1 and the n-well in the p-type substrate of the second PMOS transistor MP2 are connected to positions at which a potential is the highest in the units of the circuit. To stably operate the PMOS transistor, it is necessary for a potential of the n-well in the p-type substrate to be equal to or higher than a potential of the source. In the above-described connection, the potential of the n-well in the p-type substrate is maintained to be equal to the potential of the source, a junction leakage can be removed, and operations of the PMOS transistors can reliably be performed.

In the above-described circuit configuration, as illustrated in FIG. 3A, a circuit (see a dotted line) that starts from the gastric acid battery 10 (the external power), passes the drain of the second PMOS transistor MP2 to the source of the second PMOS transistor MP2 and reaches the second capacitor C2 (an auxiliary capacitor) is formed as an auxiliary charging circuit 211. The auxiliary charging circuit 211 charges the second capacitor C2 via the second PMOS transistor MP2 with a voltage (a power voltage) from the gastric acid battery 10 when the first clock voltage CLK1 ($V_{CLK1}$) is a high voltage value, the second clock voltage CLK2 ($V_{CLK2}$) is a low voltage value, the first PMOS transistor MP1 is turned off, and the second PMOS transistor MP2 is turned on. As illustrated in FIG. 3B, a circuit (see a dotted line) that starts from the second capacitor C2, passes the drain of the first PMOS transistor MP1 to the source of the first PMOS transistor MP1, and reaches the boost capacitor Cbt is formed as a boost charging circuit 212. When the first clock voltage CLK1 ($V_{CLK1}$) is the low voltage value, the second clock voltage CLK2 ($V_{CLK2}$) is the high voltage value, the first PMOS transistor MP1 is turned on, and the second PMOS transistor MP2 is turned off, the boost charging circuit 212 charges the boost capacitor Cbt via the first PMOS transistor MP1 with the second clock voltage CLK2 ($V_{CLK2}$: a high voltage value) through the second capacitor C2 charged with the voltage of the gastric acid battery 10, as described above.

Figure 4:
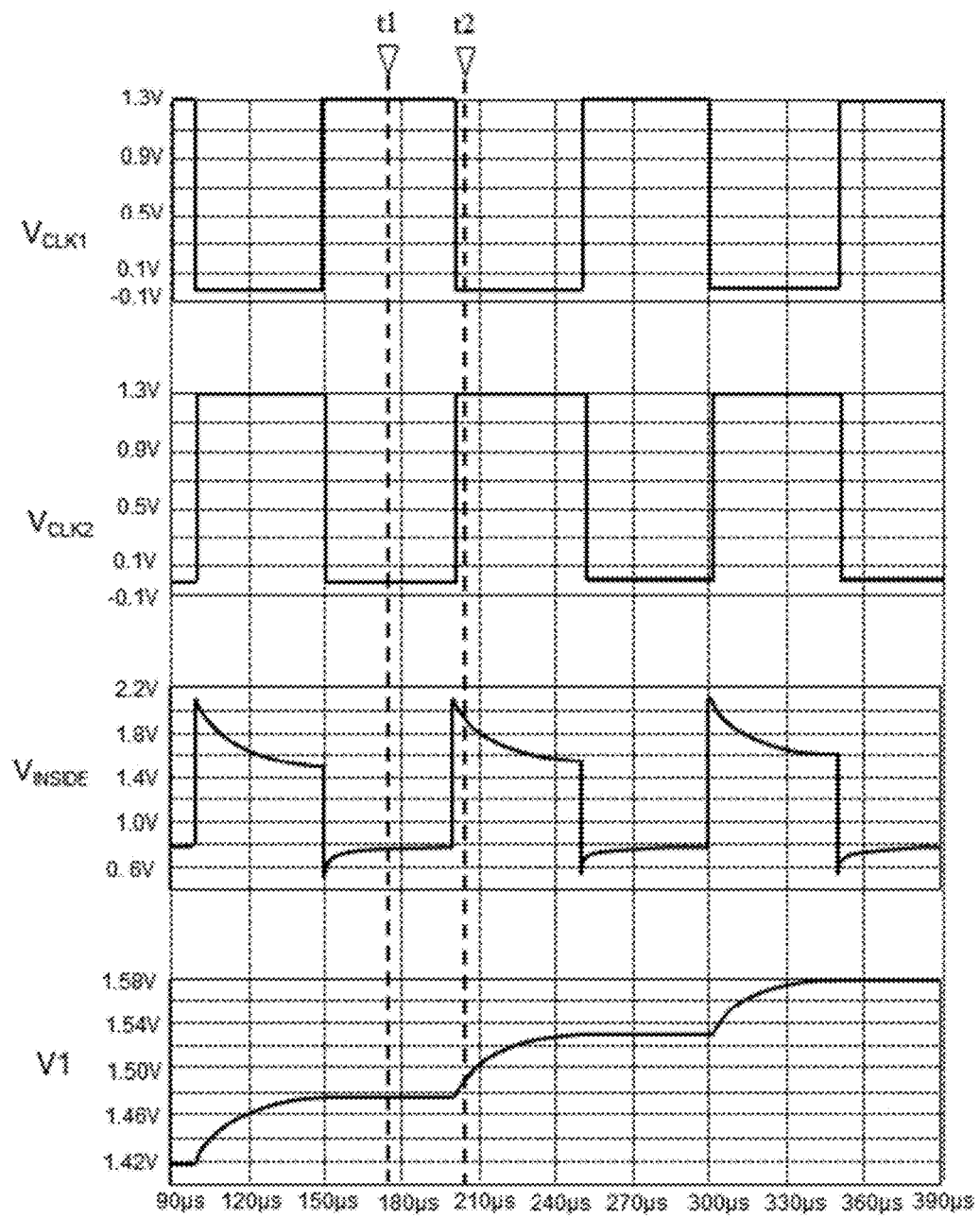
FIG. 4 is a timing chart illustrating a change in a voltage of each unit in the individual boost circuit at the first stage.

An operation of the individual boost circuit 21a will be described with reference to the timing chart illustrated in FIG. 4. In FIG. 4 illustrates a time from start of boosting 90 µs later during repetition of the boosting from an output voltage (a power voltage: for example, 1.3 V) of the gastric acid battery 10.

The first clock voltage CLK1 ($V_{CLK1}$) and the second clock voltage CLK2 ($V_{CLK2}$) that have a reciprocal relation are changed repeatedly between a high voltage value (for example, 1.3 V) and a low voltage value (for example, about 0 V). During the change, when the first clock voltage CLK1 ($V_{CLK1}$) is the high voltage value and the second clock voltage CLK2 ($V_{CLK2}$) is the low voltage value (for example, see a timing of t1), the second PMOS transistor MP2 is turned on in the off-state of the first PMOS transistor MP1. In this state, the auxiliary charging circuit 211 illustrated in FIG. 3A charges the second capacitor C2 (the auxiliary capacitor) with the output voltage (1.3 V) of the gastric acid battery 10 via the second PMOS transistor MP2 in the on-state. Thus, a charging voltage $V_{INSIDE}$ of the second capacitor C2 is gradually increased (reaches about 0.8 V, for example).

Subsequently, when the first clock voltage CLK1 ($V_{CLK1}$) is switched to the low voltage value and the second clock voltage CLK2 ($V_{CLK2}$) is switched to the high voltage value (for example, see a timing of t2), the first PMOS transistor MP1 is switched to the on-state and the second PMOS transistor MP2 is switched to the off-state. In a state after the switching, the boost charging circuit 212 illustrated in FIG. 3B charges the boost capacitor Cbt with the second clock voltage CLK2 ($V_{CLK2}$: the high voltage value=1.3 V) through the second capacitor C2 which has already been charged, as described above, via the first PMOS transistor MP1 in the on-state. Thus, the charging voltage $V_{INSIDE}$ of the second capacitor C2 is instantly increased (raised: about 2.1 V, for example) with a rise of the second clock voltage CLK2 ($V_{CLK2}$) to the high voltage value (1.3 V), and is subsequently gradually decreased due to discharging by the charging of the boost capacitor Cbt and the charging voltage V1 of the boost capacitor Cbt is gradually increased.

When the first clock voltage CLK1 ($V_{CLK1}$) is switched to the high voltage value and the second clock voltage CLK2 ($V_{CLK2}$) is switched to the low voltage value, the charging voltage $V_{INSIDE}$ of the second capacitor C2 is abruptly decreased with a fall of the second clock voltage CLK2 ($V_{CLK2}$) to the low voltage value, and subsequently the auxiliary charging circuit 211 charges the second capacitor C2 with the output voltage (1.3 V) of the gastric acid battery 10 again via the second PMOS transistor MP2 in the on-state, as described above (see FIG. 3A). Thus, as described above, the charging voltage $V_{INSIDE}$ of the second capacitor C2 which has abruptly been decreased is gradually increased (for example, reaches about 0.8 V).

Thereafter, when the first clock voltage CLK1 ($V_{CLK1}$) is switched to the low voltage value and the second clock voltage CLK2 ($V_{CLK2}$) is switched to the high voltage value, the boost charging circuit 212 illustrated in FIG. 3B charges the boost capacitor Cbt with the second clock voltage CLK2 ($V_{CLK2}$: the high voltage value=1.3 V) via the first PMOS transistor MP1 in the on-state through the second capacitor C2 which has already been charged, as described above. Thus, the charging voltage V1 of the boost capacitor Cbt is further gradually increased.

Figure 5:
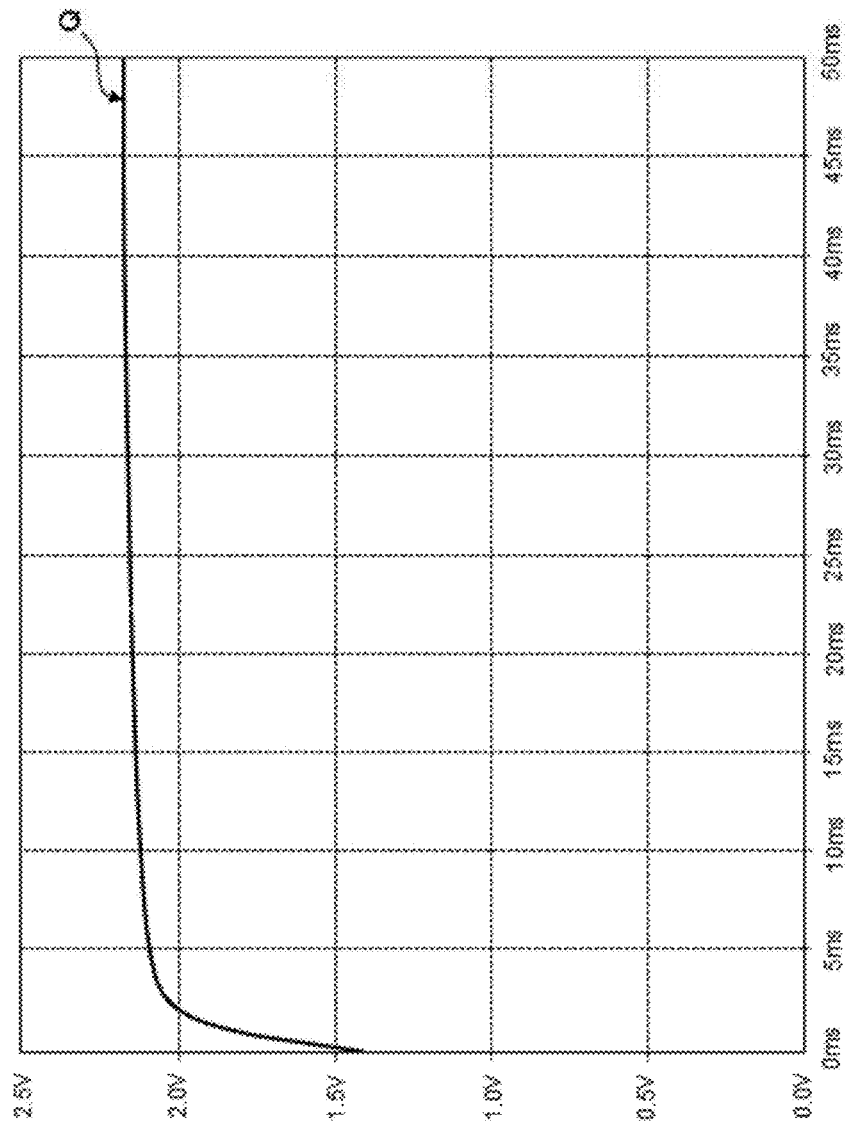
FIG. 5 is a graph illustrating a characteristic of a voltage stored in a boost capacitor in the individual boost circuit at the first stage.

Thereafter, during the repetition of the first clock voltage CLK1 ($V_{CLK1}$) and the second clock voltage CLK2 ($V_{CLK2}$) between the high voltage value and the low voltage value, the charging of the second capacitor C2 (the auxiliary capacitor) with the output voltage of the gastric acid battery 10 and the charging of the boost capacitor Cbt with the second clock voltage CLK2 ($V_{CLK2}$: the high voltage value) through the charged second capacitor C2 are alternately repeated through the above-described operations of turning the first PMOS transistor MP1 on and off and the operations of turning the second PMOS transistor MP2 on and off, which are reciprocal to the operations of turning the first PMOS transistor MP1 on and off. Thus, the charging voltage V1 of the boost capacitor Cbt is gradually increased (boosted) with characteristics based on electrical characteristics (a voltage value, a frequency, and the like) of the first clock voltage CLK1 ($V_{CLK1}$) and the second clock voltage CLK2 ($V_{CLK2}$) and electrical characteristics (a capacitance value and the like) of the second capacitor C2 (the auxiliary capacitor) and the boost capacitor Cbt. Specifically, for example, the charging voltage V1 of the boost capacitor Cbt is increased to a certain value (a target voltage value) in accordance with characteristics Q illustrated in FIG. 5.

A limitation of a voltage (see the characteristics of FIG. 5) arriving because of the boost of the individual boost circuit 21a is about twice an input power voltage of an external power (the output voltage of the gastric acid battery 10).

The above-described individual boost circuit 21a alternately repeats the charging of the second capacitor C2 (the auxiliary capacitor) with the output voltage (the power voltage) of the gastric acid battery 10 and the charging of the boost capacitor Cbt with the second clock voltage CLK2 ($V_{CLK2}$: the high voltage value) through the charged second capacitor C2 (the auxiliary capacitor). Thus, because the charging voltage $V_{INSIDE}$ of the boost capacitor Cbt is gradually increased (not instantly) to reach a target voltage, the charging voltage $V_{INSIDE}$ can be more reliably boosted to the target voltage from a minute output voltage (a power voltage) of the gastric acid battery 10.

Because each of the first and second switching transistors included in the individual boost circuit 21a includes the PMOS transistors MP1 and MP2 formed in the n-well in the p-type substrate, a substrate effect can be inhibited. Therefore, despite a minute clock voltage, the on- and off-operations can be reliably performed. As a result, the charging voltage can be more reliably boosted from the minute output voltage of the gastric acid battery 10 to the target voltage.

Referring back to FIG. 2, in the boost circuit 21 including the individual boost circuits 21a, 21b, 21c, and 21d at four stages connected in series, each of the individual boost circuits 21b, 21c, and 21d other than above-described individual boost circuit 21a at the first stage has also the first PMOS transistor MP1 (the first switching transistor), the second PMOS transistor MP2 (the second switching transistor), the first capacitor C1, and the second capacitor C2 (the auxiliary capacitor), and the boost capacitor Cbt, and thus have the same circuit configuration as the individual boost circuit 21a at the first stage described above. One end of the boost capacitor Cbt to which the other end of the individual boost circuit 21a at the first stage is grounded is connected to the drain of the second PMOS transistor MP2 of the individual boost circuit 21b at the second stage, the same end of the boost capacitor Cbt of the individual boost circuit 21b at the second stage is connected to the drain of the second PMOS transistor MP2 of the individual boost circuit 21c at the third stage, and the same end of the boost capacitor Cbt of the individual boost circuit 21c at the third stage is connected to the drain of the second PMOS transistor MP2 of the individual boost circuit 21d at the fourth stage. That is, the charged voltage with which the boost capacitor Cbt in the individual boost circuit at the preceding stage is input to each of the individual boost circuits 21b, 21c, and 21d other than the individual boost circuit 21a at the first stage as a supplied voltage which is a boost target. The boost capacitor Cbt in the individual boost circuit 21d at the final stage corresponds to the storage capacitor 23 illustrated in FIG. 1.

Figure 6A:
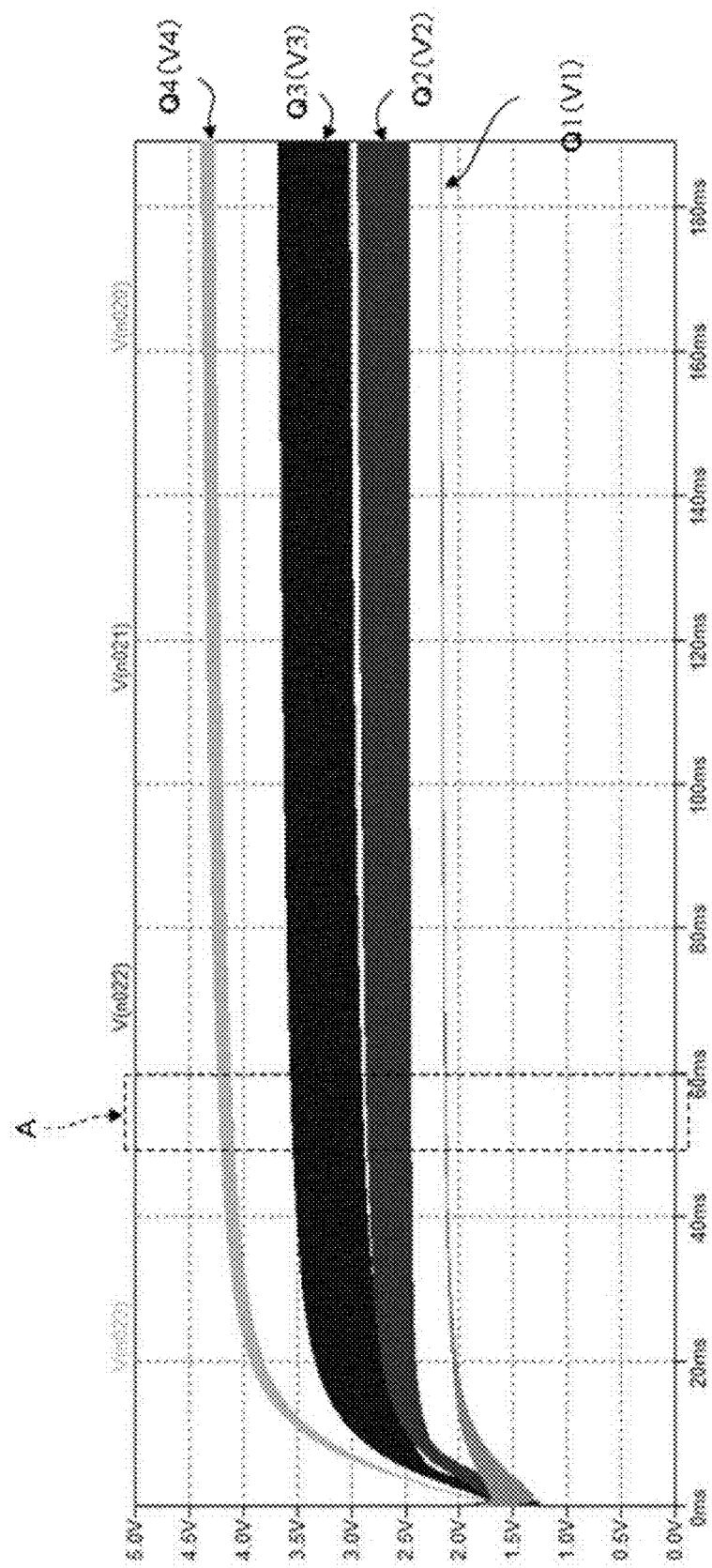
FIG. 6A is a simulation graph illustrating a characteristic of a voltage accumulated in a boost capacitor in each of the individual boost circuits at first to final stages.

In the boost circuit 21, as described above, the individual boost circuit 21a at the first stage boosts the output voltage (the power voltage of the external power) of the gastric acid battery 10 in synchronization with the first clock voltage CLK1 ($V_{CLK1}$) and the second clock voltage CLK2 ($V_{CLK2}$) to charge the boost capacitor Cbt, and each of the individual boost circuits 21b, 21c, and 21d other than the individual boost circuit 21a at the first stage further boosts the charging voltage of the boost capacitor Cbt of the individual boost circuit at the preceding stage and charges the boost capacitor Cbt at the own stage in synchronization with the first clock voltage CLK1 ($V_{CLK1}$) and the second clock voltage CLK2 ($V_{CLK2}$) as in the individual boost circuit 21a at the first stage. Thus, the voltage (the charging voltage) kept in the charging of the boost capacitor Cbt in each of the individual boost circuits 21a, 21b, 21c, and 21d at the stages is gradually increased (boosted) from the output voltage of the gastric acid battery 10. A simulation of this aspect is illustrated in FIG. 6A. A specific result of potentials V1, V2, V3, and V4 at the stages illustrated in FIG. 2 is that the charging voltage V1 of the boost capacitor Cbt of the individual boost circuit 21a at the first stage is increased in accordance with a characteristic Q1, the charging voltage V2 of the boost capacitor Cbt of the individual boost circuit 21b at the second stage is increased in accordance with a characteristic Q2, the charging voltage of the boost capacitor Cbt of the individual boost circuit 21c at the third stage is increased in accordance with a characteristic Q3, and the charging voltage V4 of the boost capacitor Cbt (the storage capacitor 23) of the individual boost circuit 21d at the final stage is increased in accordance with a characteristic Q4. In this way, arrival charging voltages of the boost capacitor Cbt of each of the individual boost circuits 21a, 21b, 21c, and 21d at the stages are further increased as the individual boost circuits at the more subsequent stages, and the voltage kept in the charging of the boost capacitor Cbt (the storage capacitor 23) of the individual boost circuit 21d at the final stage is boosted several times from the output voltage of the gastric acid battery 10. Then, the voltage obtained through the boosting (kept in the storage capacitor 23) is applied as the output voltage of the boost circuit 21 (the output voltage of the power unit 20) to the operation circuit 30 (see FIG. 1).

Figure 6B:
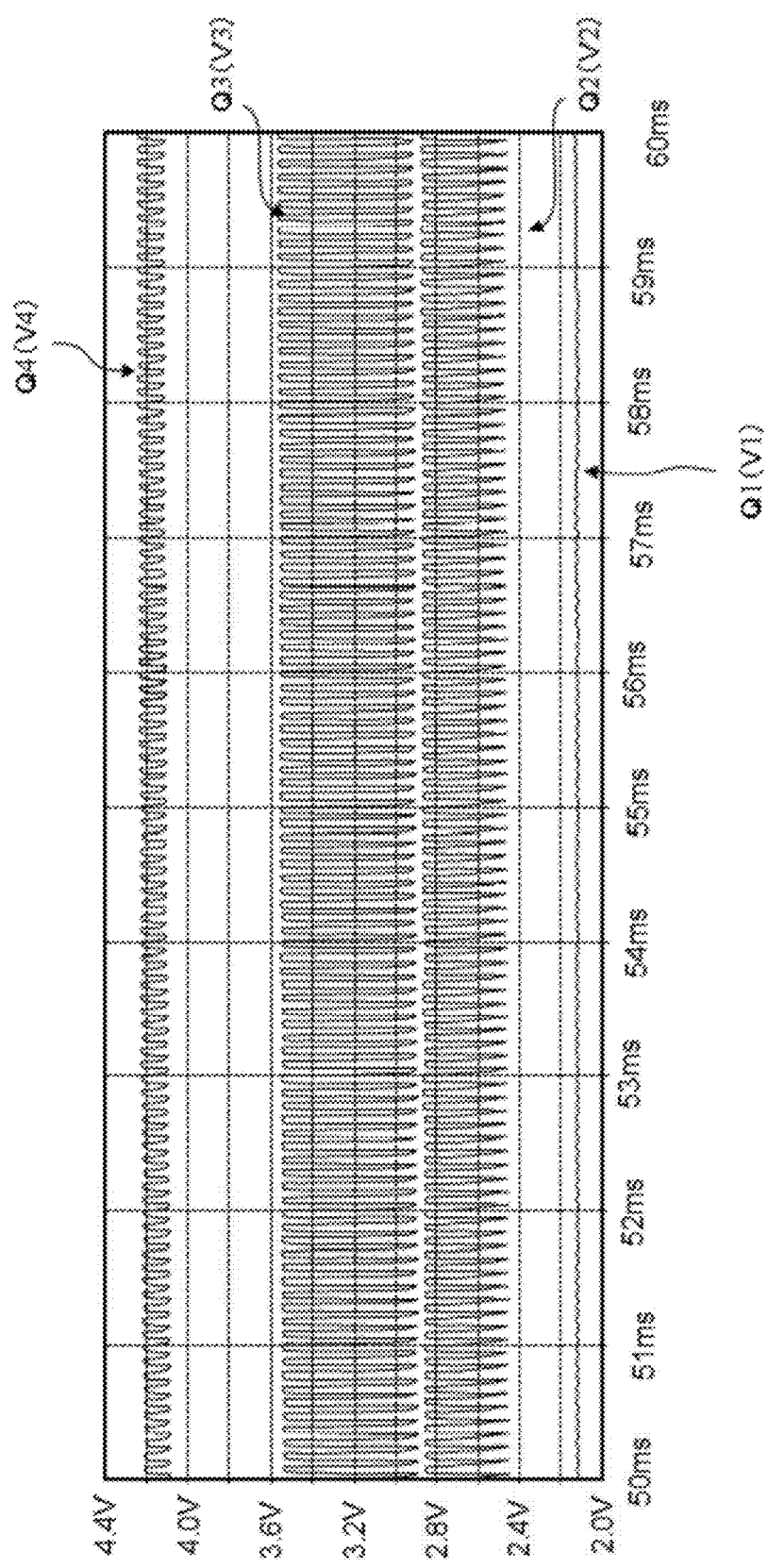
FIG. 6B is an expanded diagram illustrating a part A of FIG. 6A.

In FIG. 6A, the characteristics Q1, Q2, Q3, and Q4 increase while the voltage is repeatedly changed severely in accordance with the clocks. Therefore, voltage is shown with a line with a thick width. An expanded part A of FIG. 6A is illustrated in FIG. 6B. In FIG. 6B, it can be clearly understood that the characteristics Q1, Q2, Q3, and Q4 increase while the characteristics Q1, Q2, Q3, and Q4 are repeatedly changed severely in accordance with the clocks. It is considered that this is because discharging continues regularly at each stage in the boost circuit according to the present invention when the voltage with which the boost capacitor Cbt is charged is supplied to the subsequent stages, but the large change is caused due to an inflow of charges in the boost capacitor Cbt through only one auxiliary capacitor (the second capacitor C2) in synchronization with two clock voltages and a partial voltage becomes a leakage voltage when two transistors are included as in the boost circuit 21 in FIG. 2, as illustrated in FIG. 6A.

Here, the boost circuit 21 in FIG. 2 can boost the voltage about twice at each stage by using only two PMOS transistors, and thus characteristics Q1, Q2, Q3, and Q4 are appropriate to configure a small boost circuit.

In the above-described boost circuit 21, because each of the individual boost circuits 21a, 21b, 21c, and 21d at four stages can reliably boost the voltage to the target voltage, an output voltage (for example, about 4.3 V (see FIG. 6)) of a final target which is several times the minute output voltage (for example, 1.3 V) of the gastric acid battery 10 can be reliably obtained. Because each of the individual boost circuits 21a, 21b, 21c, and 21d at the stages can reliably boost the voltage to the target voltage, the number of individual boost circuits which are provided in consideration of a loss can be reduced (omitted) and the boost circuit 21 can be miniaturized.

Figure 7:
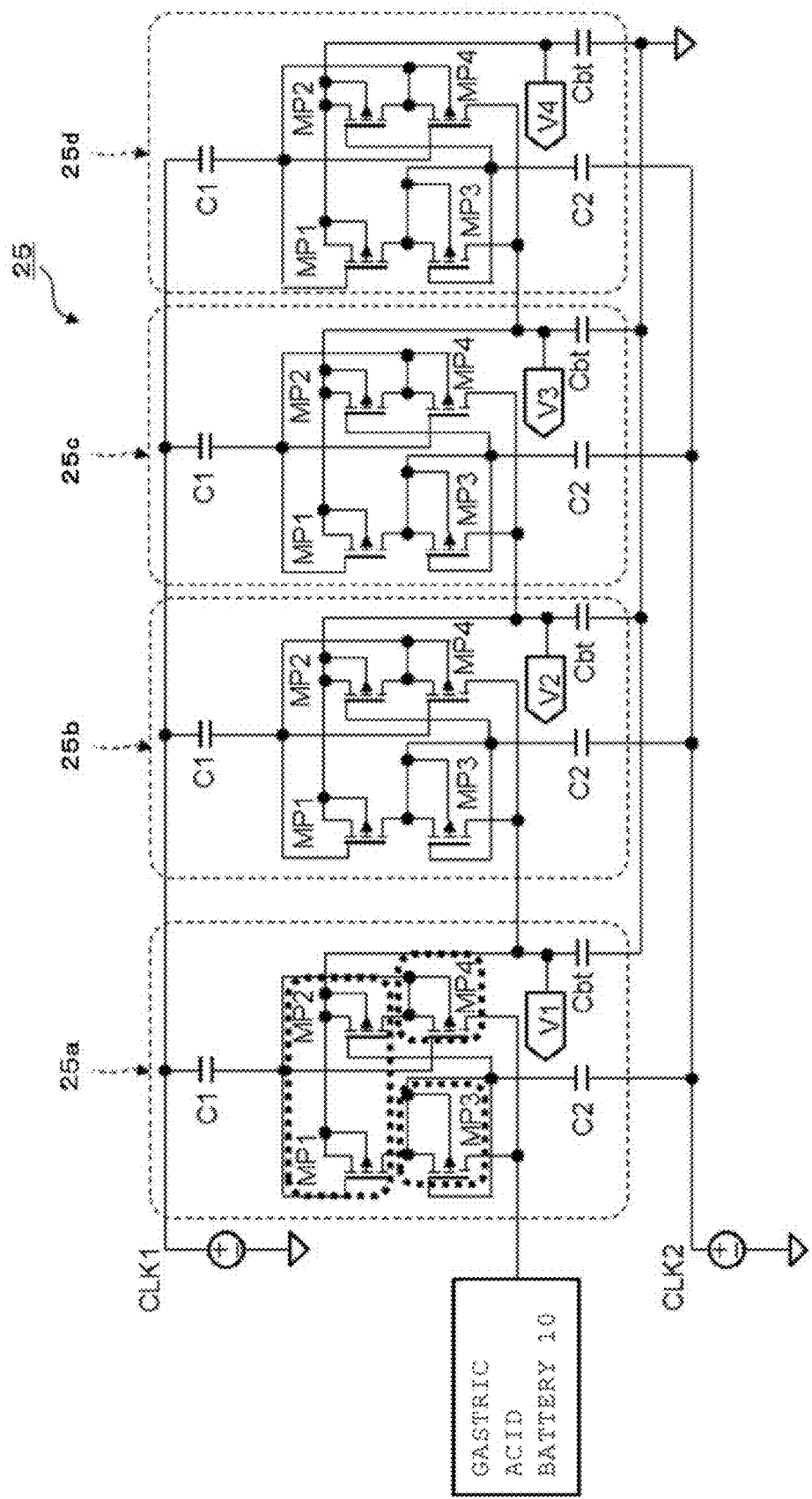
FIG. 7 is a circuit diagram illustrating a boost circuit according to a second embodiment of the present invention.
Figure 8A:
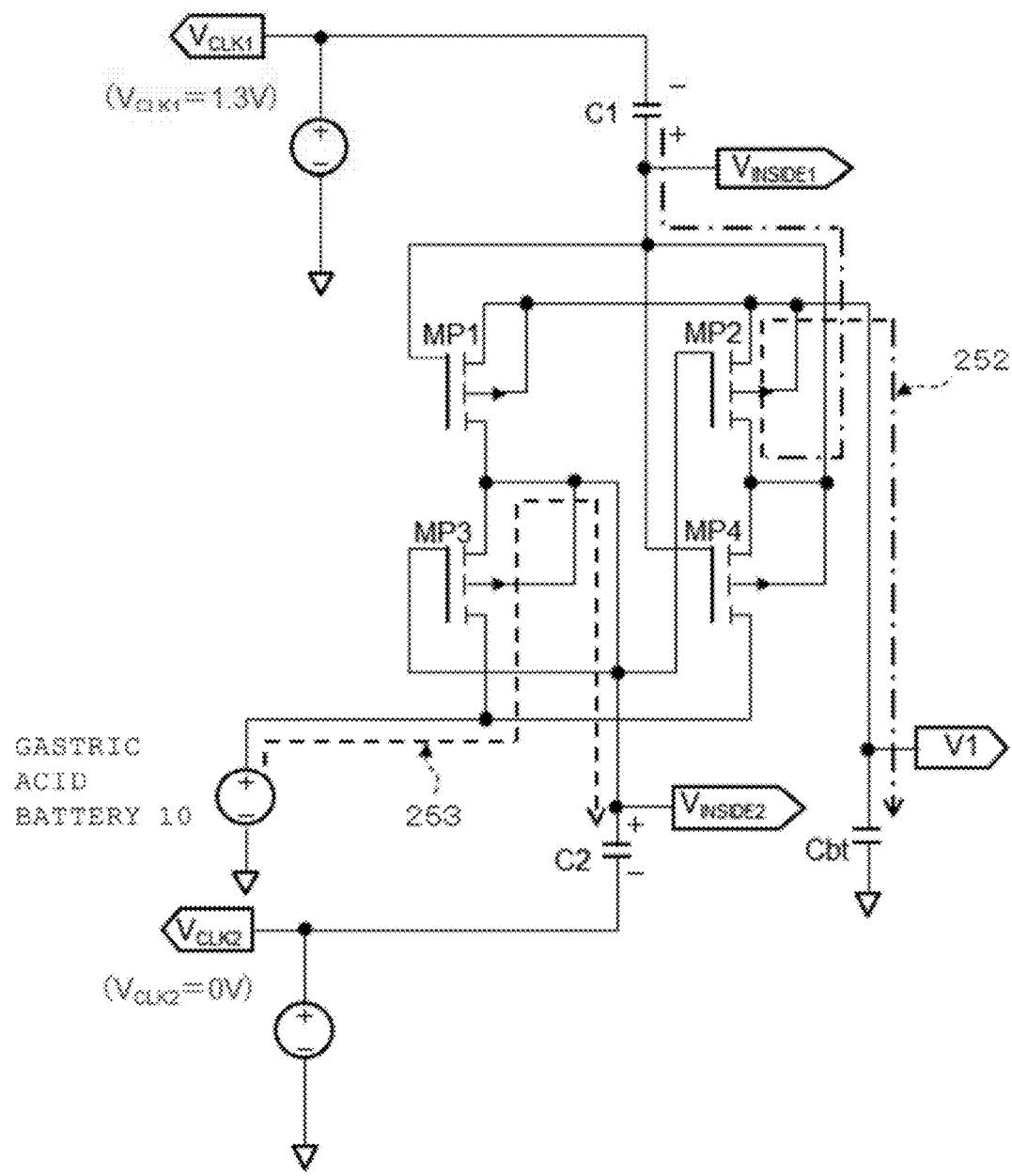
FIG. 8A is a circuit diagram (part 1) illustrating an individual boost circuit at a first stage in the boost circuit illustrated in FIG. 7.
Figure 8B:
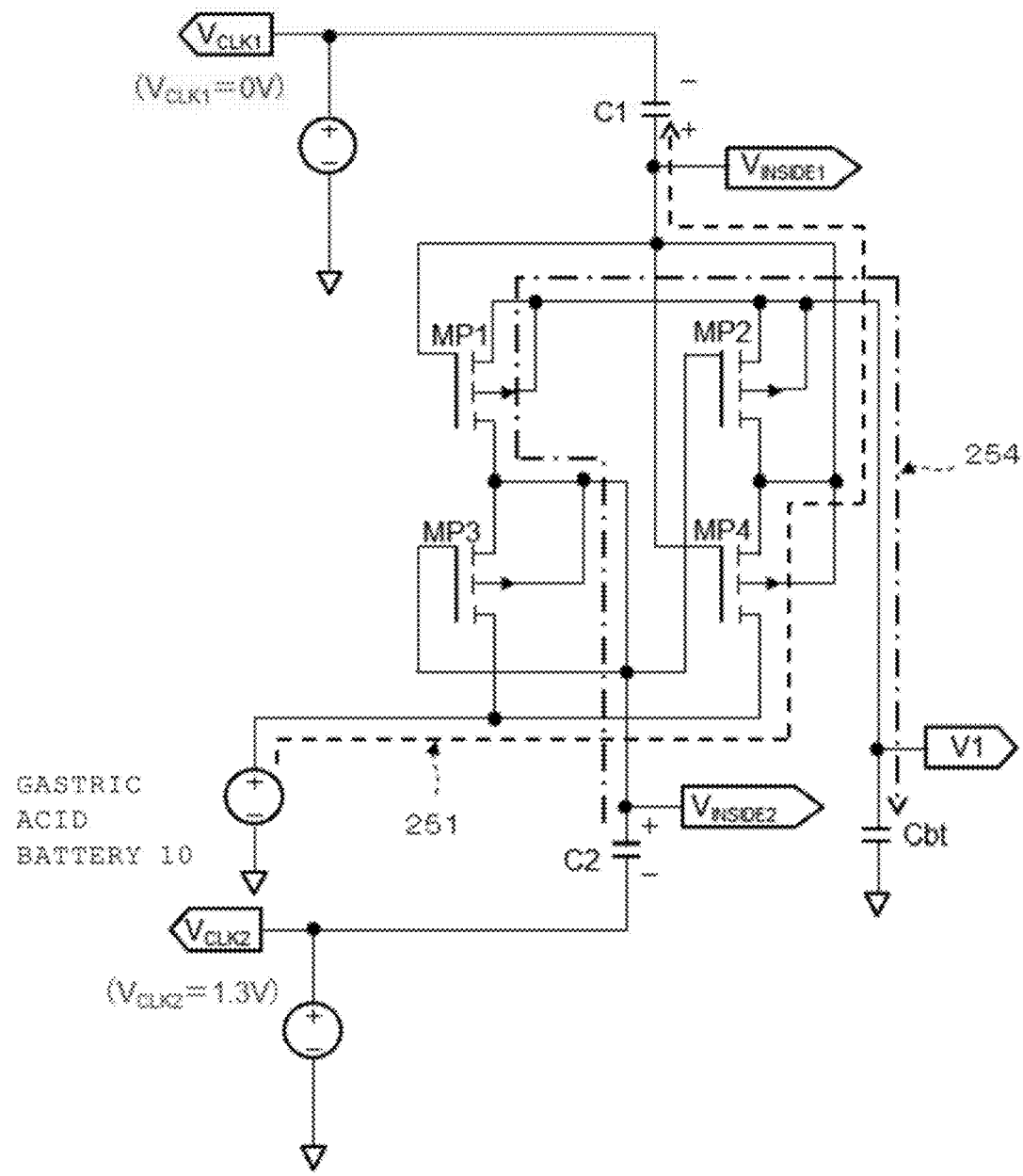
FIG. 8B is a circuit diagram (part 2) illustrating the individual boost circuit at the first stage in the boost circuit illustrated in FIG. 7.

Instead of the above-described boost circuit 21, the boost circuit according to the second embodiment of the present invention mounted in the electronic device (see FIG. 1) is configured, as illustrated in FIGS. 7, 8A, and 8B.

In a boost circuit 25, as illustrated in FIG. 7, individual boost circuits 25a, 25b, 25c, and 25d at four stages are connected in series as in the boost circuit 21 according to the above-described first embodiment (see FIG. 2). Each of the individual boost circuits 25a, 25b, 25c, and 25d at the stages is supplied with the first clock voltage CLK1 ($V_{CLK1}$) and the second clock voltage CLK2 ($V_{CLK2}$) that is reciprocal to the first clock voltage CLK1 ($V_{CLK1}$) and each of the individual boost circuits 25a, 25b, 25c, and 25d at the stages operate in synchronization with the first clock voltage CLK1 ($V_{CLK1}$) and the second clock voltage CLK2 ($V_{CLK2}$) that are reciprocal to each other. The boost circuit 25 is different from the boost circuit 21 (see FIG. 2) according to the first embodiment in that each of the individual boost circuits 25a, 25b, 25c, and 25d at the stages includes four PMOS transistors.

The individual boost circuit 25a at the first stage includes a first PMOS transistor MP1 (a first switching transistor), a second PMOS transistor MP2 (a second switching transistor), a third PMOS transistor MP3 (a third switching transistor), a fourth PMOS transistor MP4 (a fourth switching transistor), a first capacitor C1 (a first auxiliary capacitor), a second capacitor C2 (a second auxiliary capacitor), and a boost capacitor Cbt, as illustrated in FIGS. 7, 8A, and 8B. The individual boost circuit 25a at the first stage is supplied with an output voltage (a power voltage: for example, 1.3 V) from the gastric acid battery 10 in addition to the first clock voltage CLK1 ($V_{CLK1}$) and the second clock voltage CLK2 ($V_{CLK2}$). The boost capacitor Cbt and a guiding line by which the boost capacitor Cbt is connected to the output unit may not be provided when a voltage with which the boost capacitor Cbt is charged is not used for a long time, and a circuit that directly supplies a voltage to a subsequent stage may be used. Here, the boost capacitor Cbt is assumed to be provided in the description.

As in the first embodiment, an n-well is formed in a region surrounded by a thick dotted line of FIG. 7 in the p-type substrate. The n-well (in FIG. 7, only the first stage is illustrated for simplicity, but the n-well is formed at the subsequent stages in this way) is electrically isolated (insulated) from the other n-wells. As illustrated in FIG. 7, the first PMOS transistor MP1 and the second PMOS transistor MP1 may be formed in an uninsulated n-well. A connection point between a source and an n-well in a p-type substrate of the first PMOS transistor MP1 is connected to one end of the boost capacitor Cbt of which the other end is grounded and a connection point between a source and an n-well in a p-type substrate of the second PMOS transistor MP2 is similarly connected to one end of the boost capacitor Cbt. A connection point between a source and an n-well in the p-type substrate of the third PMOS transistor MP3 is connected to one end of the second capacitor C2 and is connected to a drain of the first PMOS transistor MP1. A connection point between a source and an n-well in the p-type substrate of the fourth PMOS transistor MP4 is connected to the first capacitor C1 and is connected to a drain of the second PMOS transistor MP2.

One end of the first capacitor C1 is connected to a gate of the first PMOS transistor MP1 and a gate of the fourth PMOS transistor MP4 and the first clock voltage CLK1

($V_{CLK1}$) is input to the other end of the first capacitor C1. Accordingly, the first clock voltage CLK1 ($V_{CLK1}$) is applied to the gate of the first PMOS transistor MP1 and the gate of the fourth PMOS transistor MP4 through the first capacitor C1. One end of the second capacitor C2 is connected to a gate of the second PMOS transistor MP2 and a gate of the third PMOS transistor MP3 and the second clock voltage CLK2 ($V_{CLK2}$) is input to the other end of the second capacitor C2. Accordingly, the second clock voltage CLK2 ($V_{CLK2}$) is applied to the gate of the second PMOS transistor MP2 and the gate of the third PMOS transistor MP3 through the second capacitor C2.

As in the individual boost circuit 21a in FIG. 2, the n-well in the p-type substrate of the first PMOS transistor MP1, the n-well in the p-type substrate of the second PMOS transistor MP2, the n-well in the p-type substrate of the third PMOS transistor MP3, and the n-well in the p-type substrate of the fourth PMOS transistor MP4 are connected to positions at which a potential is the highest in the units of the circuit. In the connection, a junction leakage can be removed, and operations of the PMOS transistors can reliably be performed.

In the above-described circuit configuration, as illustrated in FIG. 8A, a circuit (see a dotted line) that starts from the gastric acid battery 10 (the external power), passes the drain of the third PMOS transistor MP3 to the source of the third PMOS transistor MP3, and reaches the second capacitor C2 (a second auxiliary capacitor) is formed as a second auxiliary charging circuit 253. A circuit (see a one-dot chain line) that starts from the first capacitor C1 (a first auxiliary capacitor), passes the drain of the second PMOS transistor MP2 to the source of the second PMOS transistor MP2, and reaches the boost capacitor Cbt is formed as a first boost charging circuit 252. When the first clock voltage CLK1 ($V_{CLK1}$) is a high voltage value, the second clock voltage CLK2 ($V_{CLK2}$) is a low voltage value, the first PMOS transistor MP1 and the fourth PMOS transistor MP4 are turned off, and the second PMOS transistor MP2 and the third PMOS transistor MP3 are turned on, the second auxiliary charging circuit 253 charges the second capacitor C2 (the second auxiliary capacitor) via the third PMOS transistor MP3 with an output voltage of the gastric acid battery 10 and the first boost charging circuit 252 charges the boost capacitor Cbt via the second PMOS transistor MP2 with the first clock voltage CLK1 ($V_{CLK1}$: the high voltage value) through the first capacitor C1 which has already been charged.

As illustrated in FIG. 8B, a circuit (see a dotted line) that starts from the gastric acid battery 10 (the external power), passes the drain of the fourth PMOS transistor MP4 to the source of the fourth PMOS transistor MP4, and reaches the first capacitor C1 (the first auxiliary capacitor) is formed as a first auxiliary charging circuit 251. A circuit (see a one-dot chain line) that starts from the second capacitor C2 (the second auxiliary capacitor), passes the drain of the first PMOS transistor MP1 to the source of the first PMOS transistor MP1, and reaches the boost capacitor Cbt is formed as a second boost charging circuit 254. When the first clock voltage CLK1 ($V_{CLK1}$) is the low voltage value, the second clock voltage CLK2 ($V_{CLK2}$) is the high voltage value, the first PMOS transistor MP1 and the fourth PMOS transistor MP4 are turned on, and the second PMOS transistor MP2 and the third PMOS transistor MP3 are turned off, the first auxiliary charging circuit 251 charges the first capacitor C1 (the first auxiliary capacitor) via the fourth PMOS transistor MP4 with the output voltage of the gastric acid battery 10 and the second boost charging circuit 254 charges the boost capacitor Cbt via the first PMOS transistor MP1 with the second clock CLK2 ($V_{CLK2}$: the high voltage value) through the second capacitor C2 (the second auxiliary capacitor) which has already been charged.

Figure 9:
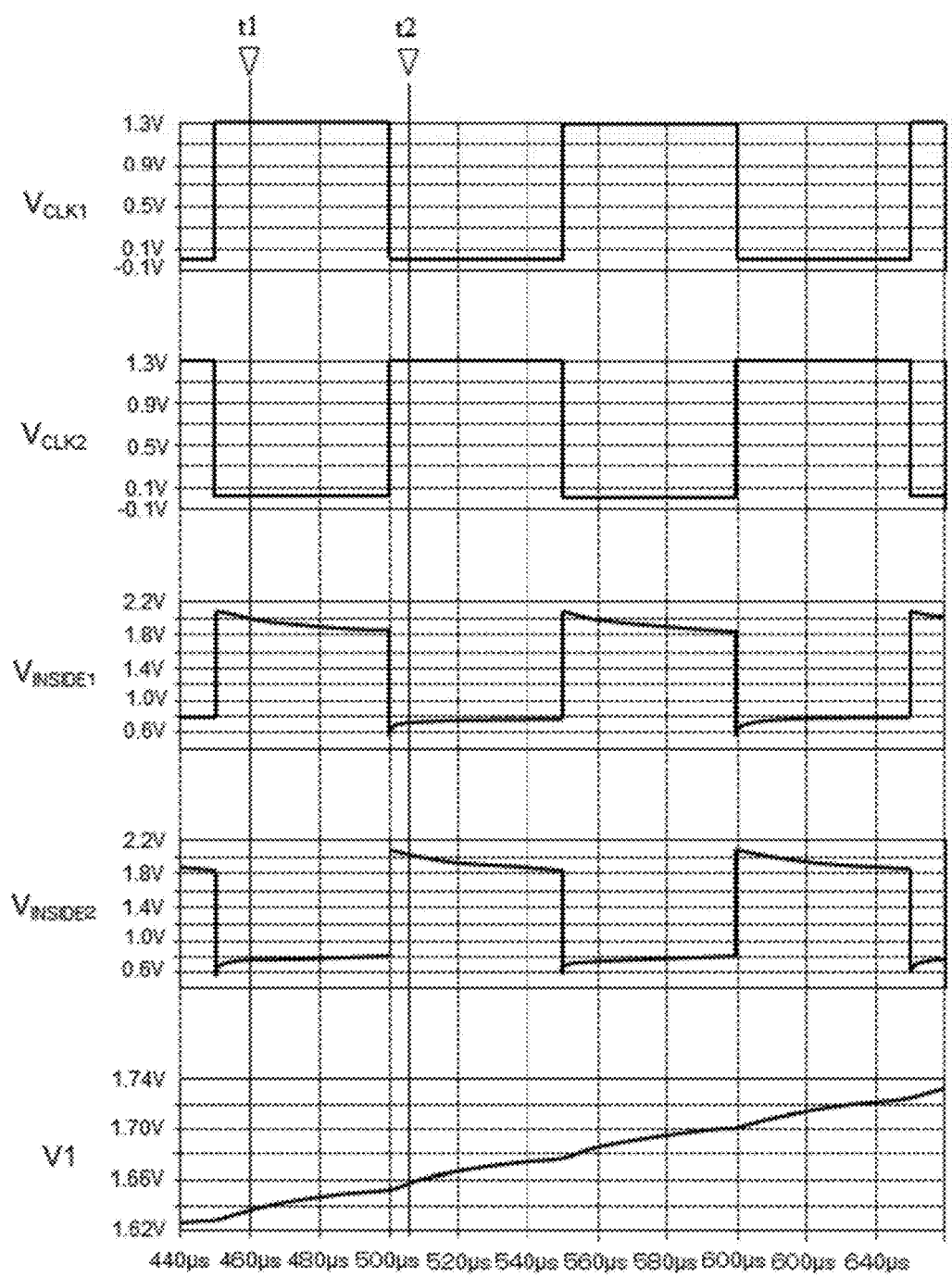
FIG. 9 is a timing chart illustrating a change in a voltage of each unit in the individual boost circuit at the first stage.

An operation of the individual boost circuit 25a will be described with reference to the timing chart illustrated in FIG. 9. In FIG. 9 illustrates a time from start of boosting 440 µs later during repetition of the boosting from an output voltage (a power voltage: for example, 1.3 V) of the gastric acid battery 10.

As in the case of the above-described first embodiment (see FIG. 4), the first clock voltage CLK1 ($V_{CLK1}$) and the second clock voltage CLK2 ($V_{CLK2}$) that have a reciprocal relation are changed repeatedly between the high voltage value and the low voltage value. During the change, when the first clock voltage CLK1 ($V_{CLK1}$) is the high voltage value and the second clock voltage CLK2 ($V_{CLK2}$) is the low voltage value (for example, see a timing of t1), the second PMOS transistor MP2 and the third PMOS transistor MP3 are turned on in the off-state of the first PMOS transistor MP1 and the fourth PMOS transistor MP4. In this state, the second auxiliary charging circuit 253 illustrated in FIG. 8A charges the second capacitor C2 (the second auxiliary capacitor) with the output voltage (1.3 V) of the gastric acid battery 10 via the third PMOS transistor MP3 in the on-state. Thus, a charging voltage $V_{INSIDE2}$ of the second capacitor C2 is gradually increased (reaches about 0.8 V, for example). Simultaneously with the charging of the second capacitor C2, the first boost charging circuit 252 illustrated in FIG. 8A charges the boost capacitor Cbt with the first clock voltage CLK1 ($V_{CLK1}$: the high voltage value=1.3 V) via the second PMOS transistor MP2 in the on-state through the first capacitor C1 (the first auxiliary capacitor) which has already been charged. Thus, the charging voltage $V_{INSIDE1}$ of the first capacitor C1 is instantly increased (raised) with a rise of the first clock voltage CLK1 ($V_{CLK1}$) to the high voltage value (1.3 V), and is subsequently gradually decreased due to discharging by the charging of the boost capacitor Cbt and the charging voltage V1 of the boost capacitor Cbt is gradually increased.

When the first clock voltage CLK1 ($V_{CLK1}$) is switched to the low voltage value and the second clock voltage CLK2 ($V_{CLK2}$) is switched to the high voltage value (for example, see a timing of t2), the first PMOS transistor MP1 and the fourth PMOS transistor MP4 are switched to the on-state and the second PMOS transistor MP2 and the third PMOS transistor MP3 are switched to the off-state. Then, the charging voltage $V_{INSIDE1}$ of the first capacitor C1 (the first auxiliary capacitor) is abruptly decreased with a fall of the first clock voltage CLK1 ($V_{CLK1}$) to the low voltage value, and subsequently the first auxiliary charging circuit 251 illustrated in FIG. 8B charges the first capacitor C1 (the first auxiliary capacitor) with the output voltage (1.3 V) of the gastric acid battery 10 via the fourth PMOS transistor MP4 in the on-state. Thus, as described above, the charging voltage $V_{INSIDE1}$ of the first capacitor C1 (the first auxiliary capacitor) which has abruptly been decreased is gradually increased (for example, reaches about 0.8 V).

Simultaneously with the above-described charging of the first capacitor C1, the second boost charging circuit 254 illustrated in FIG. 8B charges the boost capacitor Cbt with the second clock voltage CLK2 ($V_{CLK2}$: the high voltage value=1.3 V) via the first PMOS transistor MP1 in the on-state through the second capacitor C2 (the second auxiliary capacitor) which has already been charged, as described above. Thus, the charging voltage $V_{INSIDE2}$ of the second capacitor C2 is instantly increased (raised) with a rise of the second clock voltage CLK2 ($V_{CLK2}$) to the high voltage value (1.3 V), and is subsequently gradually decreased due to discharging by the charging of the boost capacitor Cbt and the charging voltage V1 of the boost capacitor Cbt is gradually increased.

Figure 10:
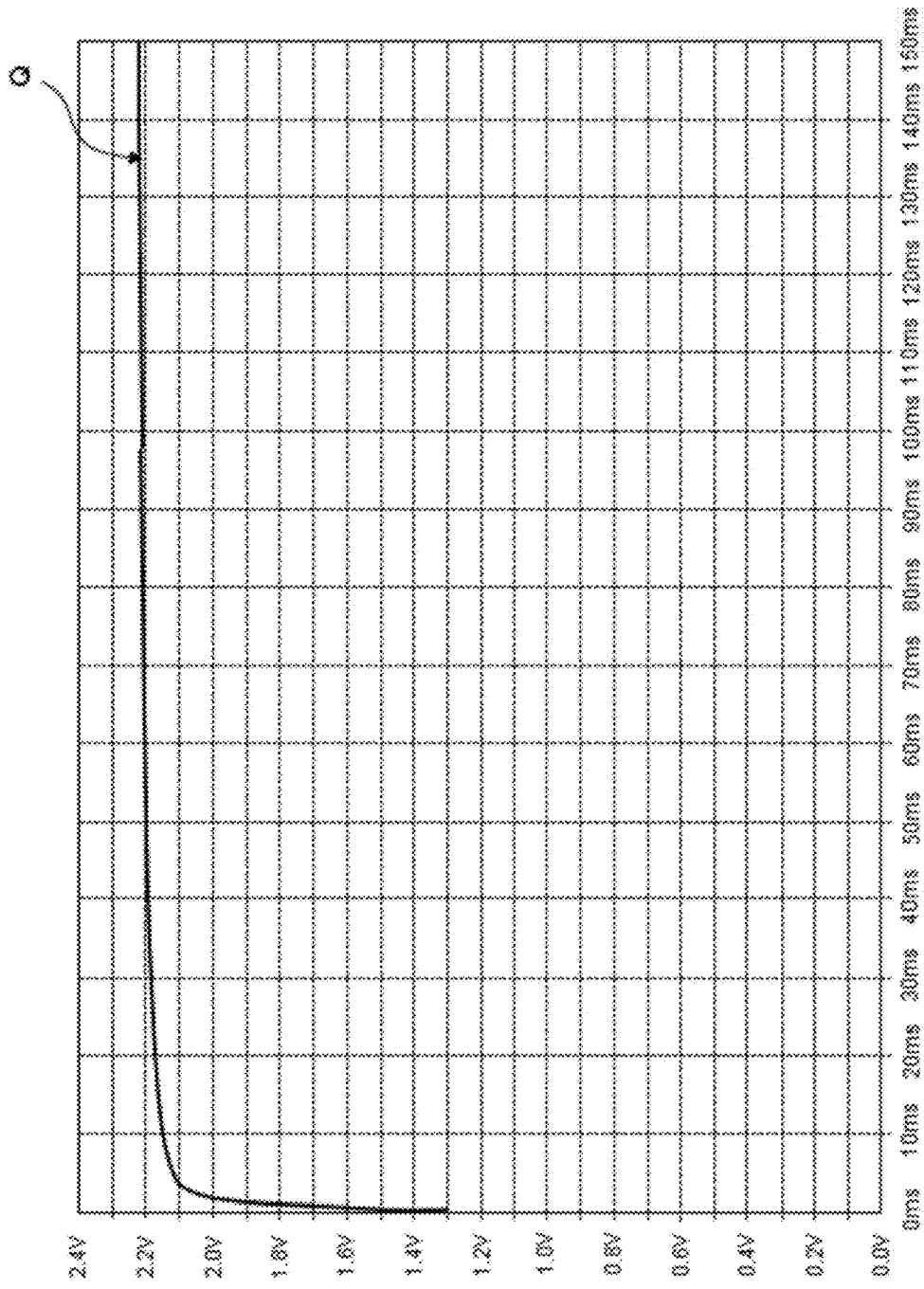
FIG. 10 is a graph illustrating a characteristic of a voltage stored in a boost capacitor in the individual boost circuit at the first stage.

Thereafter, during the repetition of the first clock voltage CLK1 ($V_{CLK1}$) and the second clock voltage CLK2 ($V_{CLK2}$) between the high voltage value and the low voltage value, the charging of the second capacitor C2 (the second auxiliary capacitor) with the output voltage of the gastric acid battery 10, the charging (see FIG. 8A) of the boost capacitor Cbt with the first clock voltage CLK1 ($V_{CLK1}$: the high voltage value) through the charged first capacitor C1 (the first auxiliary capacitor), the charging of the discharged first capacitor C1 (the first auxiliary capacitor) with the output voltage of the gastric acid battery 10, and the charging of the boost capacitor Cbt with the second clock voltage CLK2 ($V_{CLK2}$: the high voltage value) through the charged second capacitor C2 (the second auxiliary capacitor) are alternately repeated through the above-described operations of turning the first PMOS transistor MP1 and the fourth PMOS transistor MP4 on and off and the operations of turning the second PMOS transistor MP2 and the third PMOS transistor MP3 on and off, which are reciprocal to the operations of turning the first PMOS transistor MP1 and the fourth PMOS transistor MP4 on and off. Thus, the charging voltage V1 of the boost capacitor Cbt is gradually increased (boosted) with characteristics based on electrical characteristics (a voltage value, a frequency, and the like) of the first clock voltage CLK1 ($V_{CLK1}$) and the second clock voltage CLK2 ($V_{CLK2}$) and electrical characteristics (a capacitance value and the like) of the first capacitor C1, the second capacitor C2, and the boost capacitor Cbt. Specifically, for example, the charging voltage V1 of the boost capacitor Cbt is increased to a certain value (a target voltage value) in accordance with characteristics Q illustrated in FIG. 10. In particular, when the gastric acid battery 10 charges one of the first capacitor C1 and the second capacitor C2 which are charged alternately, the charging of the boost capacitor Cbt from the other capacitor which has already been charged is performed. Therefore, it is possible to efficiently increase (boost) the charging voltage V1 of the boost capacitor Cbt.

The above-described individual boost circuit 25a alternately repeats the charging of the second capacitor C2 (the second auxiliary capacitor) with the output voltage of the gastric acid battery 10 and the charging of the boost capacitor Cbt with the first clock voltage CLK1 ($V_{CLK1}$: the high voltage value) through the first capacitor C1 (the first auxiliary capacitor) which has already been charged, and the charging of the discharged first capacitor C1 (the first auxiliary capacitor) with the output voltage of the gastric acid battery 10 and the charging of the boost capacitor Cbt with the second clock voltage CLK2 ($V_{CLK2}$: the high voltage value) through the second capacitor C2 (the second auxiliary capacitor) which has already been charged. Thus, because the charging voltage V1 of the boost capacitor Cbt is gradually increased to reach a target voltage, the charging voltage can be reliably boosted to the target voltage from a minute output voltage of the gastric acid battery 10. Because the charging of the boost capacitor Cbt from two systems, the first capacitor C1 (the first auxiliary capacitor) and second capacitor C2 (the second auxiliary capacitor), is alternately performed, it is possible to boost the charging voltage of the boost capacitor Cbt more efficiently.

As in the case of the first embodiment, because each of the first to fourth switching transistors included in the individual boost circuit 25a includes the PMOS transistors MP1, MP2, MP3, and MP4 formed in the n-well in the p-type substrate, a substrate effect can be inhibited. Therefore, despite a minute clock voltage, the on- and off-operations can be reliably performed. As a result, the charging voltage can be more reliably boosted from the minute output voltage of the gastric acid battery 10 to the target voltage.

Referring back to FIG. 7, in the boost circuit 25 including the individual boost circuits 25a, 25b, 25c, and 25d at four stages connected in series, each of the individual boost circuits 25b, 25c, and 25d other than above-described individual boost circuit 25a at the first stage also has the first PMOS transistor MP1 (the first switching transistor), the second PMOS transistor MP2 (the second switching transistor), the third PMOS transistor MP3 (the third switching transistor), the fourth PMOS transistor MP4 (the fourth switching transistor), the first capacitor C1 (the first auxiliary capacitor), and the second capacitor C2 (the second auxiliary capacitor), and the boost capacitor Cbt, and thus have the same circuit configuration as the individual boost circuit 25a at the first stage described above. As in the boost circuits 21 (see FIG. 2) according to the first embodiment, the charged voltage with which the boost capacitor Cbt in each individual boost circuit (25a, 25b, and 25c) at the preceding stage is input to each of the individual boost circuits 25b, 25c, and 25d other than the individual boost circuit 25a at the first stage as a supplied voltage which is a boost target. Specifically, in each of the individual boost circuits 25b, 25c, and 25d other than the individual boost circuit 25a at the first stage, one end of the boost capacitor Cbt in each individual boost circuit (25a, 25b, and 25c) at the preceding stage is connected to the drain of the third PMOS transistor MP3 and the drain of the fourth PMOS transistor MP4. The boost capacitor Cbt in the individual boost circuit 25d at the final stage corresponds to the storage capacitor 23 illustrated in FIG. 1.

Figure 11:
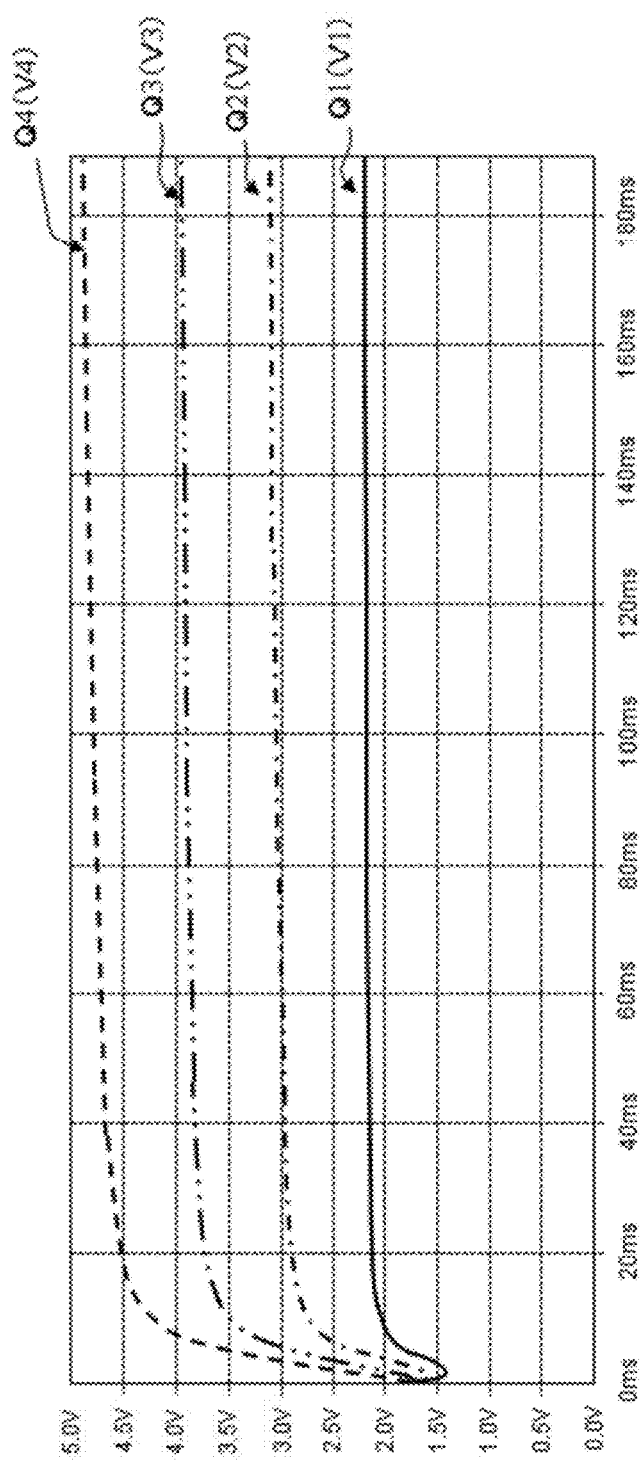
FIG. 11 is a simulation graph illustrating a characteristic of a voltage accumulated in a boost capacitor in each of the individual boost circuits at first to final stages.

In the boost circuit 25, as in the boost circuit 21 according to the first embodiment (see FIGS. 2 and 6), the voltage (the charging voltage) kept in the charging of the boost capacitor Cbt in each of the individual boost circuits 25a, 25b, 25c, and 25d at the stages is gradually increased (boosted) from the output voltage of the gastric acid battery 10. A simulation of the aspect is illustrated in FIG. 11. Specific results of potentials V1, V2, V3, and V4 of the stages illustrated in FIG. 7 are that the charging voltage V1 of the boost capacitor Cbt of the individual boost circuit 25a at the first stage is increased in accordance with the characteristic Q1, the charging voltage V2 of the boost capacitor Cbt of the individual boost circuit 25b at the second stage is increased in accordance with the characteristic Q2, the charging voltage V3 of the boost capacitor Cbt of the individual boost circuit 25c at the third stage is increased in accordance with the characteristic Q3, and the charging voltage V4 of the boost capacitor Cbt (the storage capacitor 23) of the individual boost circuit 25d at the final stage is increased in accordance with the characteristic Q4. In this way, an arrival charging voltage of the boost capacitor Cbt of each of the individual boost circuits 25a, 25b, 25c, and 25d at the stages is further increased as the individual boost circuits at the subsequent stages are located on the more subsequent side, and the voltage kept in the charging of the boost capacitor Cbt (the storage capacitor 23) of the individual boost circuit 25d at the final stage is increased several times from the output voltage of the gastric acid battery 10. Then, the voltage obtained through the boosting (kept in the storage capacitor 23) is applied as the output voltage of the boost circuit 25 (the output voltage of the power unit 20) to the operation circuit 30 (see FIG. 1).

In FIG. 11, as apparent in comparison to FIGS. 6A and 6B, a change occurring in accordance with a clock is small and a boost speed is also fast with regard to the characteristics Q1, Q2, Q3, and Q4. This is considered that this is because charges flow in the boost capacitor through only one auxiliary capacitor in synchronization with two clock voltages and a partial voltage becomes a leakage voltage, as described above, when two PMOS transistors are included as in the boost circuit 21 illustrated in FIG. 2, but charges can flow in the boost capacitor through two auxiliary capacitors in synchronization with two clock voltages, and therefore the charges can flow at a double speed and a leakage voltage can also be inhibited when four PMOS transistors are included as in the boost circuit 25 illustrated in FIG. 7.

In this way, the boost circuit 25 illustrated in FIG. 7 can boost a voltage as many as multiple times at a high speed with a small leakage voltage at each stage, and thus is appropriate as a stable boost circuit capable of realizing boosting in a short time.

In the above-described boost circuit 25, as in the boost circuit 21 according to the first embodiment of the present invention, because each of the individual boost circuits 25a, 25b, 25c, and 25d at four stages can reliably boost the voltage to the target voltage, an output voltage (for example, about 4.8 V (see FIG. 11)) of a final target which is several times the minute output voltage (for example, 1.3 V) of the gastric acid battery 10 can be reliably obtained. Because each of the individual boost circuits 25a, 25b, 25c, and 25d at the stages can reliably boost the voltage to the target voltage, the number of individual boost circuits which are provided in consideration of a loss can be reduced (omitted) and the boost circuit 25 can be miniaturized. Further, in each of the individual boost circuits 25a, 25b, 25c, and 25d at the stages, the boost capacitor Cbt is alternately charged from two systems from the first capacitor C1 (the first auxiliary capacitor) and the second capacitor C2 (the second auxiliary capacitor), and thus more efficient boosting can be performed. Therefore, efficient boosting can be performed from the minute output voltage (for example, 1.3 V) of the gastric acid battery 10 to a final target voltage (for example, about 4.8 V).

Figure 12:
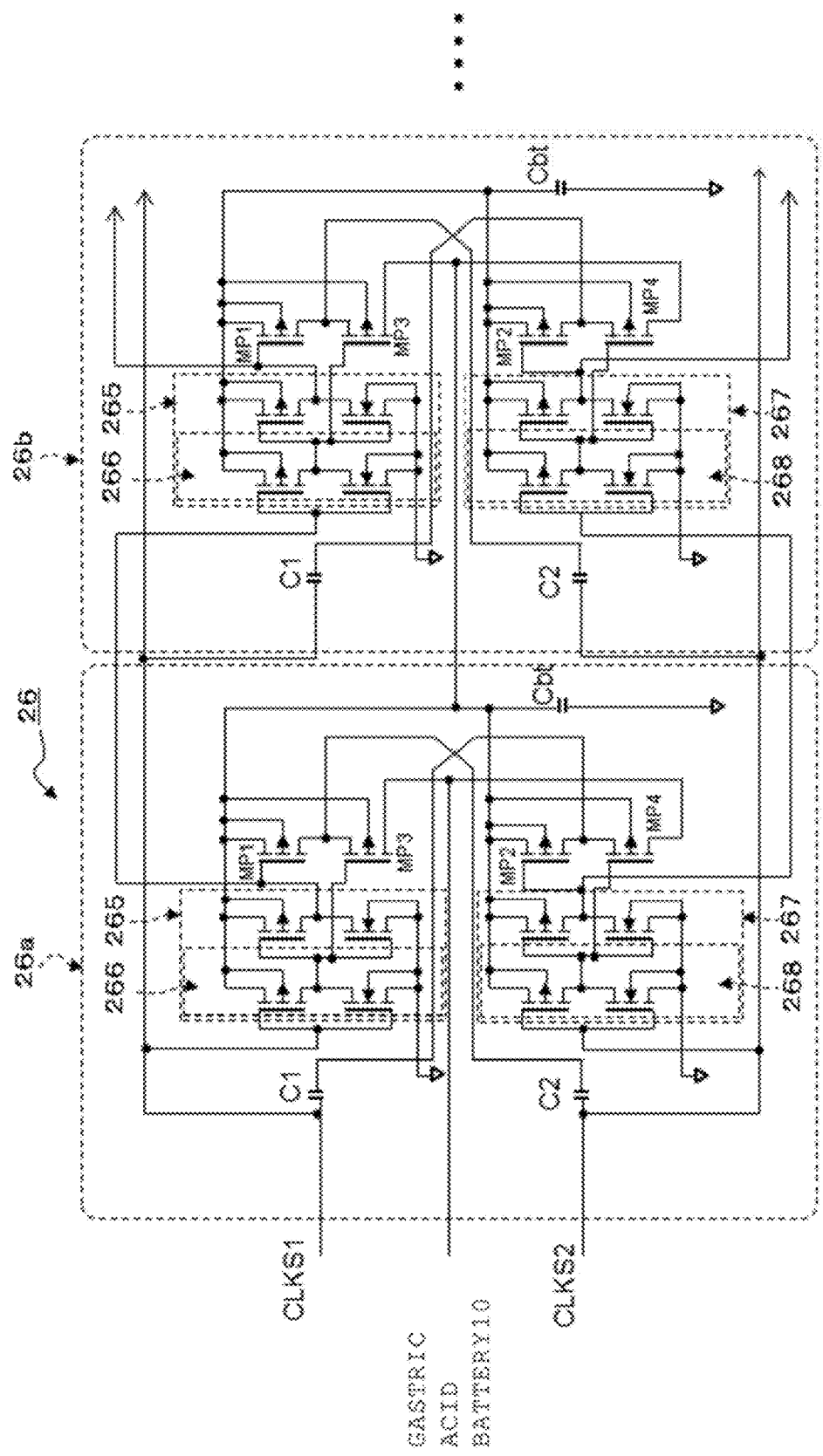
FIG. 12 is a circuit diagram illustrating a boost circuit according to a third embodiment of the present invention.
Figure 13A:
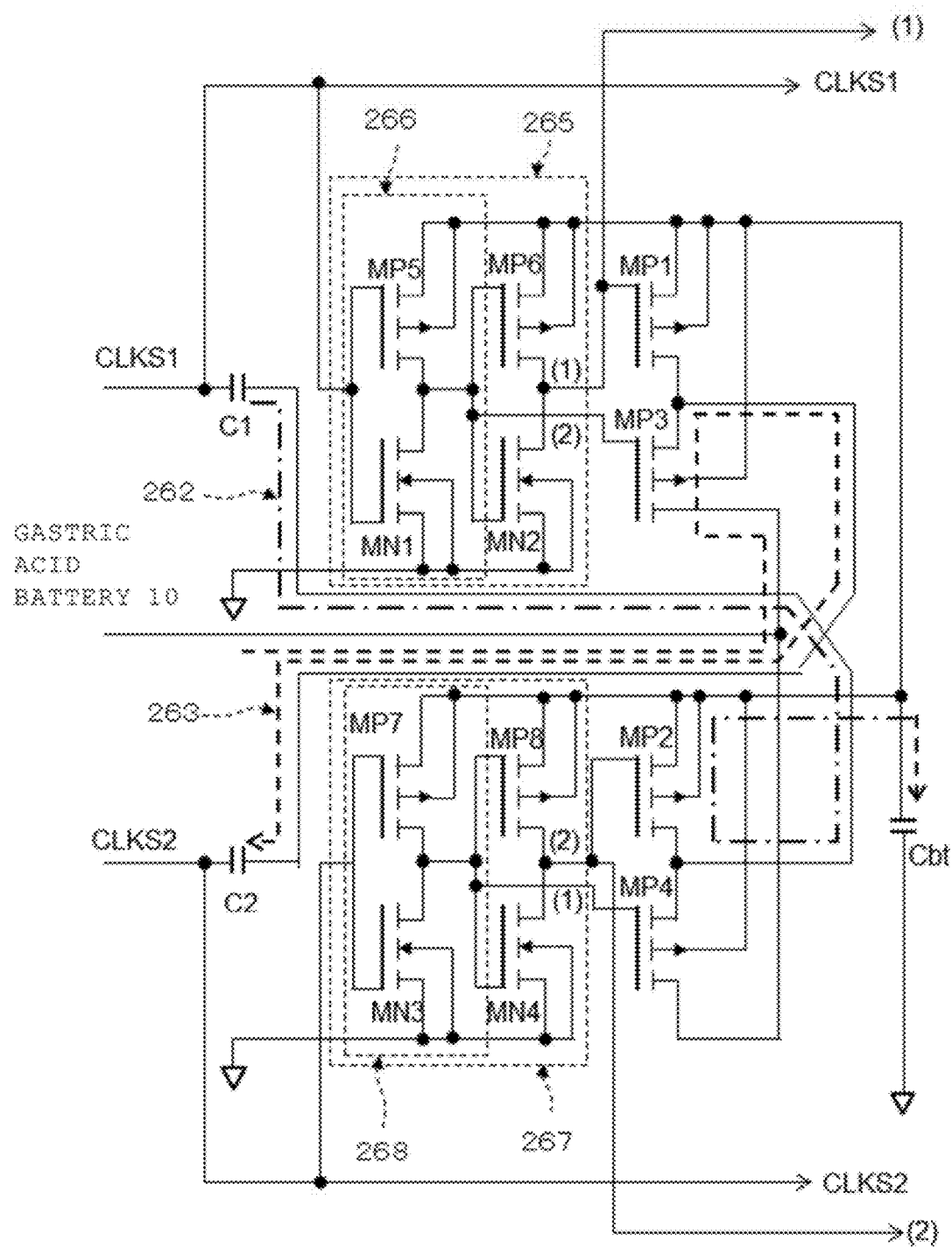
FIG. 13A is a circuit diagram (part 1) illustrating an individual boost circuit at an first stage in the boost circuit illustrated in FIG. 12.
Figure 13B:
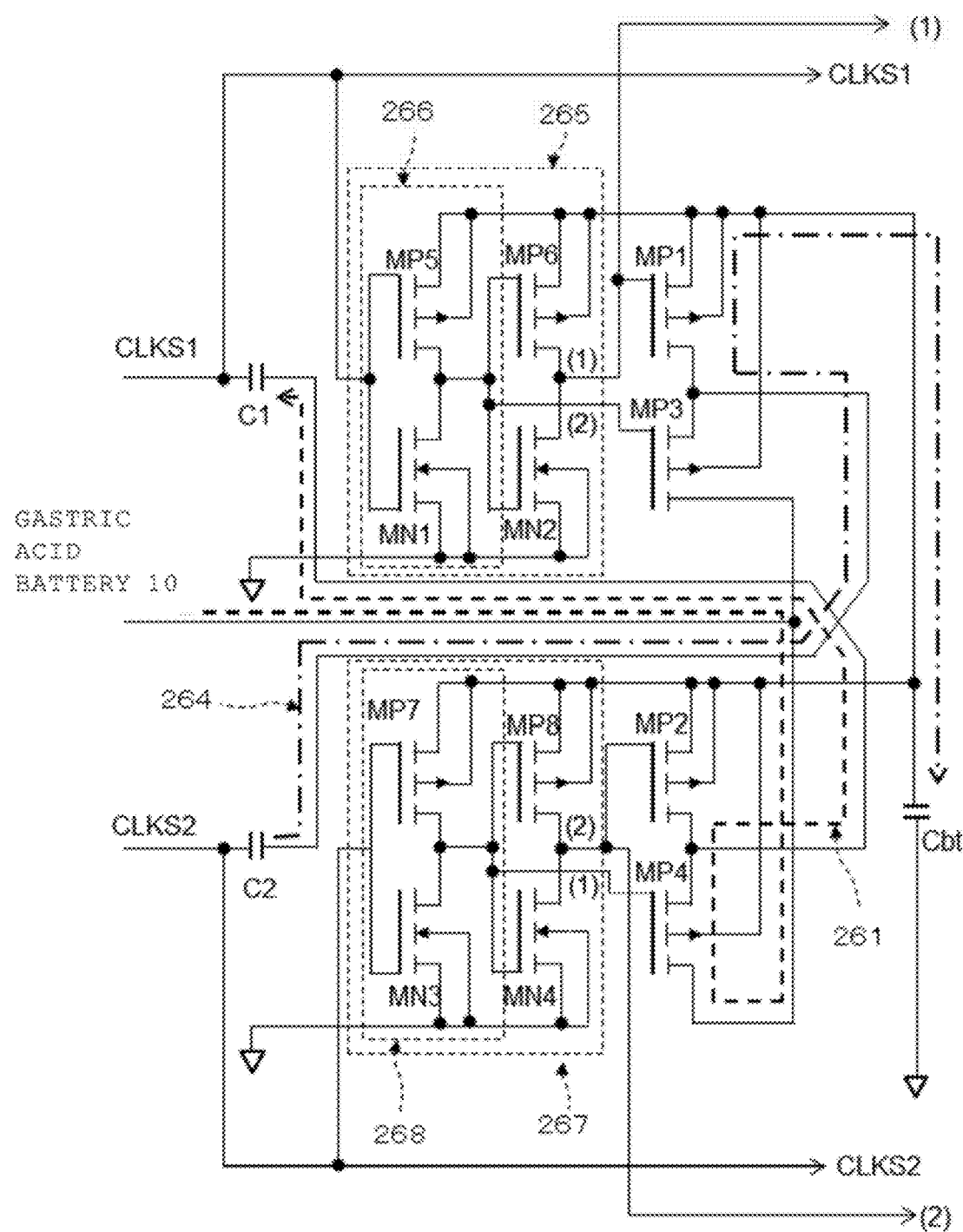
FIG. 13B is a circuit diagram (part 2) illustrating the individual boost circuit at the first stage in the boost circuit illustrated in FIG. 12.

Instead of the above-described boost circuits 21 and 25, the boost circuit according to the third embodiment of the present invention mounted in the electronic device (see FIG. 1) is configured, as illustrated in FIGS. 12, 13A, and 13B.

In a boost circuit 26, as illustrated in FIG. 12, individual boost circuits 26a, 26b, . . . at a plurality of stages are connected in series as in the above-described boost circuit 21 (see FIG. 2) and boost circuit 25 (see FIG. 7). The individual boost circuits 26a, 26b, . . . at the stages operate in synchronization with a first reference clock voltage CLKS1 and a second reference clock voltage CLKS2 that has a reciprocal relation with the first reference clock voltage CLKS1. The boost circuit 26 is different from the boost circuit 25 (see FIG. 7) in which the individual boost circuit at each stage includes four PMOS transistors according to the second embodiment in that each of the individual boost circuits 26a, 26b, . . . at the stages includes a first clock buffer circuit 265, a second clock buffer circuit 266, a third clock buffer circuit 267, and a fourth clock buffer circuit 268.

The individual boost circuit 26a at the first stage includes four PMOS transistors MP1, MP2, MP3, and MP4, a first capacitor C1 (a first auxiliary capacitor), a second capacitor C2 (a second auxiliary capacitor), and a boost capacitor Cbt, and further includes a first clock buffer circuit 265, a second clock buffer circuit 266, a third clock buffer circuit 267, and a fourth clock buffer circuit 268, as illustrated in FIGS. 13A and 13B in addition to FIG. 12. The individual boost circuit 26a at the first stage is supplied with an output voltage (a power voltage: for example, 1.3 V) from the gastric acid battery 10 in addition to the first reference clock voltage CLKS1 and the second reference clock voltage CLKS2.

A connection relation of the four PMOS transistors, that is, the first PMOS transistor MP1, the second PMOS transistor MP2, the third PMOS transistor MP3, and the fourth PMOS transistor MP4, the first capacitor C1, the second capacitor C2, and the boost capacitor Cbt is the same as the case of the boost circuit 25 according to the above-described second embodiment (see FIGS. 7, 8A, and 8B). The n-well in the p-type substrate of the third PMOS transistor MP3 is connected to a connection point of the n-well and the source in the p-type substrate of the first PMOS transistor MP1 rather than the source of the third PMOS transistor MP3. The n-well in the p-type substrate of the fourth PMOS transistor MP4 is connected to a connection point of the n-well and the source in the p-type substrate of the second PMOS transistor MP2 rather than the source of the fourth PMOS transistor MP4. In a circuit including the four PMOS transistors MP1, MP2, MP3, and MP4 and the three capacitors C1, C2, and Cbt, as illustrated in FIG. 13A, a circuit (see a dotted line) that starts from the gastric acid battery 10 (the external power), passes the drain of the third PMOS transistor MP3 to the source of the third PMOS transistor MP3, and reaches the second capacitor C2 (the second auxiliary capacitor) is formed as a second auxiliary charging circuit 263. A circuit (see a one-dot chain line) that starts from the first capacitor C1 (the first auxiliary capacitor), passes the drain of the second PMOS transistor MP2 to the source of the second PMOS transistor MP2, and reaches the boost capacitor Cbt is formed as a first boost charging circuit 262. Further, as illustrated in FIG. 13B, a circuit (see a dotted line) that starts from the gastric acid battery 10, passes the drain of the fourth PMOS transistor MP4 to the source of the fourth PMOS transistor MP4, and reaches the first capacitor C1 is formed as a first auxiliary charging circuit 261. A circuit (see a one-dot chain line) that starts from the second capacitor C2, passes the drain of the first PMOS transistor MP1 to the source of the first PMOS transistor MP1, and reaches the boost capacitor Cbt is formed as a second boost charging circuit 264.

In the first clock buffer circuit 265, a preceding-stage inversion buffer circuit configured by a PMOS transistor MP5 and an NMOS transistor MN1 and a subsequent-stage inversion buffer circuit configured by a PMOS transistor MP6 and an NMOS transistor MN2 are connected in series. The preceding-stage inversion buffer circuit (the PMOS transistor MP5 and the NMOS transistor MN1) included in the first clock buffer circuit 265 configure the single second clock buffer circuit 266. The first reference clock voltage CLKS1 is input to the first clock buffer circuit 265 and the second clock buffer circuit 266 (a common preceding-stage inversion buffer circuit). The first clock buffer circuit 265 inverts the first reference clock voltage CLKS1 twice and applies a clock voltage with the same phase as the first reference clock voltage CLKS1 as a first clock voltage (1) to the gate of the first PMOS transistor MP1. The second clock buffer circuit 266 inverts the first reference clock voltage CLKS1 and applies a clock voltage that has a reciprocal relation with the first reference clock voltage CLKS1 as a second clock voltage (2) to the gate of the third PMOS transistor MP3.

In the third clock buffer circuit 267, a preceding-stage inversion buffer circuit configured by a PMOS transistor MP7 and an NMOS transistor MN3 and a subsequent-stage inversion buffer circuit configured by a PMOS transistor MP8 and an NMOS transistor MN4 are connected in series. The preceding-stage inversion buffer circuit (the PMOS transistor MP7 and the NMOS transistor MN3) included in the third clock buffer circuit 267 configure the single fourth clock buffer circuit 268. The second reference clock voltage CLKS2 which has a reciprocal relation with the first reference clock voltage CLKS1 is input to the third clock buffer circuit 267 and the fourth clock buffer circuit 268 (a common preceding-stage inversion buffer circuit). The third clock buffer circuit 267 inverts the second reference clock voltage CLKS2 twice and applies a clock voltage with the same phase as the second reference clock voltage CLKS2, that is, with the reciprocal relation with the first reference clock voltage CLKS1 as a second clock voltage (2) to the gate of the second PMOS transistor MP2. The fourth clock buffer circuit 268 inverts the second reference clock voltage CLKS2 and applies a clock voltage that has a reciprocal relation with the second reference clock voltage CLKS2, that is, has the same phase as the first reference clock voltage CLKS1, as the first clock voltage (1) to the gate of the fourth PMOS transistor MP4.

In the individual boost circuit 26a that has the above-described configuration, the first reference clock voltage CLKS1 and the second reference clock voltage CLKS2 that have a reciprocal relation are changed repeatedly between the high voltage value and the low voltage value. During the change, when the first reference clock voltage CLKS1 is the high voltage value and the second reference clock voltage CLKS2 is the low voltage value, a clock voltage serving as the first clock voltage (1) of the high voltage value is applied from the first clock buffer circuit 265 to the gate of the first PMOS transistor MP1 and a clock voltage serving as the first clock voltage (1) of the high voltage value is applied from the fourth clock buffer circuit 268 to the gate of the fourth PMOS transistor MP4. In addition, a clock voltage serving as the second clock voltage (2) of the low voltage value is applied from the second clock buffer circuit 266 to the gate of the third PMOS transistor MP3 and a clock voltage serving as the second clock voltage (2) of the low voltage value is applied from the third clock buffer circuit 267 to the gate of the second PMOS transistor MP2. Thus, the second PMOS transistor MP2 and the third PMOS transistor MP3 enter the on-state in the off-state of the first PMOS transistor MP1 and the fourth PMOS transistor MP4.

In this state, the second auxiliary charging circuit 263 illustrated in FIG. 13A charges the second capacitor C2 (the second auxiliary capacitor) with the output voltage of the gastric acid battery 10 via the third PMOS transistor MP3 in the on-state. Thus, the charging voltage (corresponding to $V_{INSIDE2}$ in FIG. 9) of the second capacitor C2 is gradually increased. Simultaneously, the first boost charging circuit 262 illustrated in FIG. 13A charges the boost capacitor Cbt with the first reference clock voltage CLKS1 (the high voltage value corresponding to the first clock voltage (1)) via the second PMOS transistor MP2 in the on-state through the first capacitor C1 (the first auxiliary capacitor) which has already been charged. Thus, the charging voltage (corresponding to $V_{INSIDE1}$ in FIG. 9) of the first capacitor C1 is instantly increased (raised) with a rise of the first reference clock voltage CLKS1 to the high voltage value and is subsequently gradually decreased due to discharging by the charging of the boost capacitor Cbt and the charging voltage (corresponding to V1 in FIG. 9) of the boost capacitor Cbt is gradually increased.

On the other hand, when the first reference clock voltage CLKS1 and the second reference clock voltage CLKS2 are inverted, a clock voltage serving as the first clock voltage (1) of the low voltage value is applied from the first clock buffer circuit 265 to the gate of the first PMOS transistor MP1 and a clock voltage serving as the first clock voltage (1) of the low voltage value is applied from the fourth clock buffer circuit 268 to the gate of the fourth PMOS transistor MP4. In addition, a clock voltage serving as the second clock voltage (2) of the high voltage value is applied from the second clock buffer circuit 266 to the gate of the third PMOS transistor MP3 and a clock voltage serving as the second clock voltage (2) of the high voltage value is applied from the third clock buffer circuit 267 to the gate of the second PMOS transistor MP2. Thus, the second PMOS transistor MP2 and the third PMOS transistor MP3 are switched to the off-state in the on-state of the first PMOS transistor MP1 and the fourth PMOS transistor MP4.

In this state, after the charging voltage (corresponding to $V_{INSIDE1}$ in FIG. 9) of the first capacitor C1 is abruptly decreased due to a fall of the first reference clock voltage CLKS1 to the low voltage value, the first auxiliary charging circuit 261 illustrated in FIG. 13B charges the first capacitor C1 (the first auxiliary capacitor) with the output voltage of the gastric acid battery 10 via the fourth PMOS transistor MP4 in the on-state. Thus, the charging voltage (corresponding to $V_{INSIDE1}$ in FIG. 9) of the first capacitor C1 (the first auxiliary capacitor) instantly decreased, as described above, is gradually increased. Simultaneously, the second boost charging circuit 264 illustrated in FIG. 13B charges the boost capacitor Cbt with the second reference clock voltage CLKS2 (the high voltage value corresponding to the second clock voltage (2)) via the first PMOS transistor MP1 in the on-state through the second capacitor C2 (the second auxiliary capacitor) which has already been charged. Thus, the charging voltage (corresponding to $V_{INSIDE2}$ in FIG. 9) of the second capacitor C2 is instantly increased (raised) with a rise of the second reference clock CLK2 to the high voltage value, and is subsequently gradually decreased due to discharging by the charging of the boost capacitor Cbt and the charging voltage (corresponding to V1 in FIG. 9) of the boost capacitor Cbt is gradually increased.

Thereafter, during repetition of the first reference clock voltage CLKS1 and the second reference clock voltage CLKS2 between the high voltage value and the low voltage value, the first PMOS transistor MP1 using the clock voltage serving as the first clock voltage (1) generated from the first reference clock voltage CLKS1 by the first clock buffer circuit 265 and the fourth PMOS transistor MP4 using the clock voltage serving as the first clock voltage (1) generated from the second reference clock voltage CLKS2 by the fourth clock buffer circuit 268 each repeat the on- and off-operations with the same phase. On the other hand, the third PMOS transistor MP3 using the clock voltage serving as the second clock voltage (2) generated from the first reference clock voltage CLKS1 by the second clock buffer circuit 266 and the second PMOS transistor MP2 using the clock voltage serving as the second clock voltage (2) generated from the second reference clock voltage CLKS2 by the third clock buffer circuit 267 each repeat the on- and off-operations with the same phase that is, reciprocally with the on- and off-operations of the first PMOS transistor MP1 and the fourth PMOS transistor MP4.

Through the above-described on- and off-operations of the first PMOS transistor MP1 and the fourth PMOS transistor MP4 and the on- and off-operations of the second PMOS transistor MP2 and the third PMOS transistor MP3 which are reciprocal to the on- and off-operations of the first PMOS transistor MP1 and the fourth PMOS transistor MP4, the charging of the second capacitor C2 (the second auxiliary capacitor) with the output voltage of the gastric acid battery 10 and the charging of the boost capacitor Cbt with the first reference clock voltage CLKS1 (the high voltage value) through the charged first capacitor C1 (the first auxiliary capacitor) (see FIG. 13A), and the charging of the discharged first capacitor C1 (the first auxiliary capacitor) with the output voltage of the gastric acid battery 10 and the charging of the boost capacitor Cbt with the second reference clock voltage CLKS2 (the high voltage value) through the charged second capacitor C2 (the second auxiliary capacitor) are alternately repeated. Thus, the charging voltage (corresponding to V1 in FIG. 9) of the boost capacitor Cbt is gradually increased (boosted) with characteristics based on electrical characteristics (a voltage value, a frequency, and the like) of the first reference clock voltage CLKS1 and the second reference clock voltage CLKS2 and electrical characteristics (a capacitance value and the like) of the first capacitor C1, the second capacitor C2, and the boost capacitor Cbt. Specifically, for example, the charging voltage V of the boost capacitor Cbt is increased to a certain value (a target voltage value) in accordance with characteristics Q illustrated in FIG. 10.

The above-described individual boost circuit 26a can reliably boost the voltage to the target voltage from the minute output voltage of the gastric acid battery 10 as in the case of the boost circuit 25 according to the second embodiment (see FIGS. 7, 8A, and 8B). Because the charging of the boost capacitor Cbt from two systems, the first capacitor C1 (the first auxiliary capacitor) and second auxiliary capacitor C2 (the second auxiliary capacitor), is alternately performed, it is possible to boost the charging voltage of the boost capacitor Cbt more efficiently. Because each of the first to fourth switching transistors included in the individual boost circuit 26a includes the PMOS transistors MP1, MP2, MP3, and MP4 formed in the n-well in the p-type substrate, a substrate effect can be inhibited. Therefore, despite a minute clock voltage, the on- and off-operations can be reliably performed. As a result, the charging voltage can be more reliably boosted from the minute output voltage of the gastric acid battery 10 to the target voltage.

Further, the above-described individual boost circuit 26a can turn on and off the first PMOS transistor MP1 and the third PMOS transistor MP3 further reliably using two clock voltages serving as the first clock voltage (1) and the second clock voltage (2) that have the reciprocal relation and are generated and reinforced by the first clock buffer circuit 265 and the second clock buffer circuit 266 from the first reference clock voltage CLKS1. The individual boost circuit 26a can turn the second PMOS transistor MP2 and the fourth PMOS transistor MP4 on and off further reliably using two clock voltages serving as the first clock voltage (1) and the second clock voltage (2) that have the reciprocal relation and are generated and reinforced by the third clock buffer circuit 267 and the fourth clock buffer circuit 268 from the second reference clock voltage CLKS2 which has the reciprocal relation with the first reference clock voltage CLKS1. As a result, the charging voltage can be more reliably boosted from the minute output voltage of the gastric acid battery 10.

Referring back to FIG. 12, each of the individual boost circuits 26a, 26b, . . . at the plurality of stages connected in series also includes the first PMOS transistor MP1 (the first switching transistor), the second PMOS transistor MP2 (the second switching transistor), the third PMOS transistor MP3 (the third switching transistor), the fourth PMOS transistor MP4 (the fourth switching transistor), the first capacitor C1 (the first auxiliary capacitor), the second capacitor C2 (the second auxiliary capacitor), the boost capacitor Cbt, the first clock buffer circuit 265, the second clock buffer circuit 266, the third clock buffer circuit 267, the fourth clock buffer circuit 268, and thus has the same circuit configuration as the above-described individual boost circuit 25a at the first stage. As in the boost circuit 25 (see FIG. 7) according to the second embodiment, the charged voltage with which the boost capacitor Cbt in the individual boost circuit (25a) at the preceding stage is input to each of the individual boost circuits 26b, . . . other than the individual boost circuit 26a at the first stage as the supplied voltage which is a boost target.

In each of the individual boost circuit 26b, . . . at the stages other than the individual boost circuit 26a at the first stage, the clock voltage (the first clock voltage (1): the same phase as the first reference clock voltage CLKS1) from the first clock buffer circuit 265 in the individual boost circuit (25a) at the preceding stage is input as the first reference clock voltage to the first clock buffer circuit 265 and the second clock buffer circuit 266. In addition, the clock voltage (the second clock voltage (2): the same phase as the second reference clock voltage CLKS2) from the third clock buffer circuit 267 in the individual boost circuit (25a) at the preceding stage is input as the second reference clock voltage to the third clock buffer circuit 267 and the fourth clock buffer circuit 268.

In the above-described boost circuit 25, as in the boost circuit 25 according to the second embodiment of the present invention, each of the individual boost circuits 26a, 26b, . . . at the plurality of stages can reliably boost the voltage to the target voltage. Therefore, it is possible to reliably obtain the output voltage of the final target which is several times the minute output voltage of the gastric acid battery 10. Because each of the individual boost circuits 26a, 26b, . . . at the stages can reliably boost the voltage to the target voltage, the number of individual boost circuits which are provided in consideration of a loss can be reduced (omitted) and the boost circuit 25 can be miniaturized. Further, each of the individual boost circuits 26a, 26b, . . . at the stages can boost the voltage more efficiently because the charging of the boost capacitor Cbt from two systems, the first capacitor C1 (the first auxiliary capacitor) and second capacitor C2 (the second auxiliary capacitor), is alternately performed. Therefore, it is possible to boost the charging voltage to the final target voltage from the minute output voltage of the gastric acid battery 10 efficiently.

Further, the first reference clock voltage which is a basis of the clock voltage serving as the first clock voltage (1) for turning the first PMOS transistor MP1 on and off and the second clock voltage for turning the third PMOS transistor on and off is reinforced by the first clock buffer circuit 265 at the preceding stage. The second reference clock voltage which is a basis of the clock voltage serving as the second clock voltage for turning the second PMOS transistor on and off and the clock voltage serving as the first clock voltage for turning the fourth PMOS transistor on and off is reinforced by the third clock buffer circuit at the preceding stage. Therefore, it is possible to reliably turn each of the first to fourth PMOS transistors on and off in the individual boost circuit at each stage. The degree of reinforcement of the clock voltages increases in the individual boost circuit at the more subsequent stage. As a result, it is possible to boost the voltage to the final target voltage from the minute output voltage of the gastric acid battery 10 more reliably.

In each of the individual boost circuits 26a, 26b, ... at the stages of the boost circuit 26 according to the third embodiment, the first reference clock voltage CLKS1 may be input to the first clock buffer circuit 265 and the second clock buffer circuit 266 and the second reference clock voltage CLKS2 may be input to the third clock buffer circuit 267 and the fourth clock buffer circuit 268.

In each of the individual boost circuits 26a, 26b, ... at the stages of the boost circuit 26 according to the third embodiment, a clock voltage (with the same phase as the first reference clock voltage) serving as the first clock voltage (1) from the first clock buffer circuit 265 at the preceding stage may be input to the first capacitor C1 instead of the first reference clock voltage CLKS1, and a clock voltage (with the same phase as the second reference clock voltage CLKS2) serving as the second clock voltage (2) from the third clock buffer circuit 267 at the preceding stage may be input to the second capacitor C2 instead of the second reference clock voltage CLKS2.

Further, each of the individual boost circuits 26a, 26b, ... at the stages of the boost circuit 26 according to the third embodiment can also be configured using two PMOS transistors rather than four PMOS transistors. In this case, the individual boost circuit at each stage is configured as the circuit illustrated in FIGS. 3A and 3B by, for example, the first PMOS transistor MP1, the third PMOS transistor MP3, the first capacitor C1, the second capacitor C2, and the boost capacitor Cbt illustrated in FIGS. 13A and 13B. The first reference clock voltage CLKS1 is input to the first capacitor C1 and the second clock voltage CLK2 is input to the second capacitor. Further, a first clock buffer circuit (equivalent to the first clock buffer circuit 265) is provided to generate a clock voltage serving as the first clock voltage (1) to be input to the gate of the first PMOS transistor MP1 from the first reference clock voltage CLKS1 and a second clock buffer circuit (equivalent to the third clock buffer circuit 267) is provided to generate a clock voltage serving as the second clock voltage (2) to be input to the gate of the third PMOS transistor MP3 from the second reference clock voltage CLKS2.

The switching transistors in the individual boost circuit at each stage in each of the above-described boost circuits 21, 25, and 26 are configured as the PMOS transistors, but the present invention is not limited thereto and switching transistors that have another configuration may be used. For example, a circuit that has similar advantages can be obtained by forming p-wells on an n-type substrate and forming NMOS transistors on the p-wells.

An external power connected to the individual boost circuit at the first stage in each of the above-described boost circuits 21, 25, and 26 is the gastric acid battery 10, but the present invention is not limited thereto and an any type of power may be used. Further, the present invention is not limited to each of the boost circuits 21, 25, and 26 mounted in the above-described swallow type device (see FIG. 1) and each of the boost circuits 21, 25, and 26 may be mounted in any of various electronic devices operating with a power voltage.

The present invention is not limited to the above-described embodiments and the modification examples. Various modifications can be made on the gist of the present invention and the modifications are not excluded from the scope of the present invention.

INDUSTRIAL APPLICABILITY

The boost circuit according to the present invention can be used as a boost circuit which has the advantages of achieving miniaturization and obtaining an output voltage which is a final target more reliably from a minute power voltage and can perform boosting without using a coil or the like.

REFERENCE SIGNS LIST

10 Gastric acid battery
20 Power unit
21, 25, 26 Boost circuit
21a to 21d, 25a to 25d, 26a, 26b Individual boost circuit
30 Operation circuit
211 Auxiliary charging circuit
212 Boost charging circuit
251, 261 First auxiliary charging circuit
252, 262 First boost charging circuit
253, 263 Second auxiliary charging circuit
254, 264 Second boost charging circuit
265 First clock buffer circuit
266 Second clock buffer circuit
267 Third clock buffer circuit
268 Fourth clock buffer circuit

The invention claimed is:

1. An individual boost circuit comprising:
   a first PMOS transistor configured to operate in synchronization with a first clock voltage changed between a high voltage value and a low voltage value that is lower than the high voltage value, so as to enter an off-state when the first clock voltage is a high voltage value and to enter an on-state when the first clock voltage is a low voltage value, and being with a gate to which the first clock voltage is applied;
   a second PMOS transistor configured to operate in synchronization with a second clock voltage that has a reciprocal relation with the first clock voltage so as to enter an off-state when the second clock voltage is the high voltage value and to enter an on-state when the second clock voltage is the low voltage value, and being with a gate to which the second clock voltage is applied;
   an auxiliary capacitor;
   an auxiliary charging circuit configured to charge, when the first PMOS transistor is in an off-state and the second PMOS transistor is in an on-state, the auxiliary capacitor with a supplied voltage via the second PMOS transistor; and
   a boost charging circuit configured to supply, when the first PMOS transistor is in an on-state and the second PMOS transistor is in an off-state, a voltage to a circuit at a subsequent stage via the first PMOS transistor by a voltage corresponding to the second clock voltage through the auxiliary capacitor charged with the supplied voltage.

2. The individual boost circuit according to claim 1, wherein
   a source of the first PMOS transistor is connected to the circuit at the subsequent stage,
   a source of the second PMOS transistor is connected to the auxiliary capacitor and is connected to a drain of the first PMOS transistor,
   a drain of the second PMOS transistor is connected to a power of the supplied voltage,
   the auxiliary charging circuit includes a circuit starting from the power, passing the drain of the second PMOS transistor to the source of the second PMOS transistor, and reaching the auxiliary capacitor, and the boost charging circuit includes a circuit starting from the auxiliary capacitor, passing the drain of the first PMOS transistor to the source of the first PMOS transistor, and reaching the circuit at the subsequent stage.

3. The individual boost circuit according to claim 2, further comprising:
a circuit configured to apply the second clock voltage to the gate of the second PMOS transistor through the auxiliary capacitor.

4. The individual boost circuit according to claim 2, further comprising:
a first clock buffer circuit configured to generate, from a first reference clock voltage, a clock voltage applied as the first clock voltage to the gate of the first PMOS transistor; and
a second clock buffer circuit configured to generate, from a second reference clock voltage that has a reciprocal relation with the first reference clock voltage, a clock voltage applied as the second clock voltage to the gate of the second PMOS transistor.

5. A boost circuit comprising:
individual boost circuits at a plurality of stages connected in series, wherein
each of the individual boost circuits at the plurality of stages includes the individual boost circuit according to claim 1, and
a power voltage of an external power is input to an individual boost circuit at a first stage as the supplied voltage and a charged voltage to the circuit at the subsequent stage in the individual boost circuit at a preceding stage is input to the individual boost circuit at each stage other than the first stage as the supplied voltage.

6. An electronic device comprising:
a boost circuit according to claim 5; and
an operation circuit configured to operate when a voltage is supplied from the boost circuit.

7. An electronic device comprising:
a boost circuit including the individual boost circuit according to claim 1; and
an operation circuit configured to operate when a voltage is supplied from the boost circuit.

8. An individual boost circuit comprising:
a first PMOS transistor;
a second PMOS transistor;
an auxiliary capacitor; and
a circuit at a subsequent stage, wherein
a source of the first PMOS transistor is connected to the circuit at the subsequent stage,
a gate and a source of the second PMOS transistor are connected to the auxiliary capacitor and is connected to a drain of the first PMOS transistor,
a drain of the second PMOS transistor is connected to a power of a supplied voltage, and
a gate of the first PMOS transistor and the auxiliary capacitor are respectively connected to first and second clock voltages that have a reciprocal relation.

9. The individual boost circuit according to claim 8, wherein
an n-well in a p-type substrate of the first PMOS transistor is connected to the circuit at the subsequent stage, and
an n-well in a p-type substrate of the second PMOS transistor is connected to the auxiliary capacitor.

10. An individual boost circuit comprising,
first and fourth switching transistors configured to operate in synchronization with a first clock voltage changed between a high voltage value and a low voltage value that is lower than the high voltage value so as to enter an off-state when the first clock voltage is a high voltage value and to enter an on-state when the first clock voltage is a low voltage value;
second and third switching transistors configured to operate in synchronization with a second clock voltage that has a reciprocal relation with the first clock voltage so as to enter an off-state when the second clock voltage is the high voltage value and to enter an on-state when the second clock voltage is the low voltage value;
a first auxiliary capacitor;
a second auxiliary capacitor;
a first auxiliary charging circuit configured to charge the first auxiliary capacitor with a supplied voltage via the fourth switching transistor when the second switching transistor is in an off-state and the fourth switching transistor is in an on-state;
a first boost charging circuit configured to supply, when the second switching transistor is in an on-state and the fourth switching transistor is in an off-state, a voltage to a circuit at a subsequent stage via the second switching transistor by a voltage corresponding to the first clock voltage through the first auxiliary capacitor charged with the supplied voltage;
a second auxiliary charging circuit configured to charge, when the first switching transistor is in an off-state and the third switching transistor is in an on-state, the second auxiliary capacitor with the supplied voltage via the third switching transistor; and
a second boost charging circuit configured to supply, when the first switching transistor is in an on-state and the third switching transistor is in an off-state, a voltage to the circuit at the subsequent stage via the first switching transistor by a voltage corresponding to the second clock voltage through the second auxiliary capacitor charged with the supplied voltage.

11. The individual boost circuit according to claim 10, wherein
the first switching transistor is a first PMOS transistor with a gate to which the first clock voltage is applied, the second switching transistor is a second PMOS transistor with a gate to which the second clock voltage is applied, the third switching transistor is a third PMOS transistor with a gate to which the second clock voltage is applied, and the fourth switching transistor is a fourth PMOS transistor with a gate to which the first clock voltage is applied.

12. The individual boost circuit according to claim 11, wherein a source of the first PMOS transistor is connected to a circuit at a subsequent stage,
a source of the second PMOS transistor is connected to the circuit at the subsequent stage,
a source of the third PMOS transistor is connected to the second auxiliary capacitor and is connected to a drain of the first PMOS transistor,
a source of the fourth PMOS transistor is connected to the first auxiliary capacitor and is connected to a drain of the second PMOS transistor,
the first auxiliary charging circuit includes a circuit starting from a power of the supplied voltage, passing a drain of the fourth PMOS transistor to the source of the fourth PMOS transistor, and reaching the first auxiliary capacitor,
the second auxiliary charging circuit includes a circuit starting from the power, passing a drain of the third PMOS transistor to the source of the third PMOS transistor, and reaching the second auxiliary capacitor, the first boost charging circuit includes a circuit starting from the first auxiliary capacitor, passing the drain of the second PMOS transistor to the source of the second PMOS transistor, and reaching the circuit at the subsequent stage, and the second boost charging circuit includes a circuit starting from the second auxiliary capacitor, passing the drain of the first PMOS transistor to the source of the first PMOS transistor, and reaching the circuit at the subsequent stage.

13. The individual boost circuit according to claim 11, further comprising:

a circuit configured to apply the first clock voltage to the gate of the first PMOS transistor and the gate of the fourth PMOS transistor through the first auxiliary capacitor.

14. The individual boost circuit according to claim 11, further comprising:

a circuit configured to apply the second clock voltage to the gate of the second PMOS transistor and the gate of the third PMOS transistor through the second auxiliary capacitor.

15. The individual boost circuit according to claim 11, further comprising:

a first clock buffer circuit configured to generate, from a first reference clock voltage, a clock voltage applied as the first clock voltage to the gate of the first PMOS transistor;

a second clock buffer circuit configured to generate, from the first reference clock voltage, a clock voltage applied as the second clock voltage to the gate of the third PMOS transistor;

a third clock buffer circuit configured to generate, from a second reference clock voltage that has a reciprocal relation with the first reference clock voltage, a clock voltage applied as the second clock voltage to the gate of the second PMOS transistor; and a fourth clock buffer circuit configured to generate, from the second reference clock voltage, a clock voltage applied as the first clock voltage to the gate of the fourth PMOS transistor.

16. The individual boost circuit according to claim 15, wherein the first boost charging circuit includes a circuit that supplies a voltage to the circuit at the subsequent stage via the second PMOS transistor by the first reference clock voltage through the first auxiliary capacitor charged with the supplied voltage.

17. The individual boost circuit according to claim 15, wherein the second boost charging circuit includes a circuit that supplies a voltage to the circuit at the subsequent stage via the first PMOS transistor by the second reference clock voltage through the second auxiliary capacitor charged with the supplied voltage.

18. A boost circuit comprising:

individual boost circuits at a plurality of stages connected in series, wherein each of the individual boost circuits at the plurality of stages includes the individual boost circuit according to claim 10, and wherein a power voltage of an external power is input to the individual boost circuit at a first stage as the supplied voltage and a charged voltage to the circuit at the subsequent stage in the individual boost circuit at a preceding stage is input to the individual boost circuit at each stage other than the first stage as the supplied voltage.

19. An individual boost circuit comprising:

a first PMOS transistor;
a second PMOS transistor;
a third PMOS transistor;
a fourth PMOS transistor;
a first auxiliary capacitor; and
a second auxiliary capacitor, wherein a source of the first PMOS transistor is connected to a circuit at a subsequent stage, a source of the second PMOS transistor is connected to the circuit at the subsequent stage, a gate and a source of the third PMOS transistor are connected to a gate of the second PMOS transistor and the second auxiliary capacitor and are connected to a drain of the first PMOS transistor, a source of the fourth PMOS transistor is connected to a gate of the first PMOS transistor and the first auxiliary capacitor and is connected to a drain of the second PMOS transistor, a drain of the third PMOS transistor and a drain of the fourth PMOS transistor are connected to a power of a supplied voltage, and the first and second auxiliary capacitors are respectively connected to the first and second clock voltages that have a reciprocal relation.

20. The individual boost circuit according to claim 19, wherein an n-well of a p-type substrate of the first PMOS transistor is connected to the circuit at the subsequent stage, an n-well of a p-type substrate of the second PMOS transistor is connected to the circuit at the subsequent stage, an n-well of a p-type substrate of the third PMOS transistor is connected to the second auxiliary capacitor, and an n-well of a p-type substrate of the fourth PMOS transistor is connected to the first auxiliary capacitor.

21. A boost circuit comprising:

individual boost circuits at a plurality of stages connected in series, wherein each of the individual boost circuits at the plurality of stages includes the individual boost circuit, and a power voltage of an external power is input to an individual boost circuit at a first stage as the supplied voltage and a charged voltage to the circuit at the subsequent stage in the individual boost circuit at a preceding stage is input to the individual boost circuit at each stage other than the first stage as the supplied voltage, a clock voltage from the first clock buffer circuit in the individual boost circuit at a preceding stage is input to the first clock buffer circuit of the individual boost circuit at each stage other than the first stage as the first reference clock voltage, and a clock voltage from the second clock buffer circuit in the individual boost circuit at the preceding stage is input to the second clock buffer circuit of the individual boost circuit at each stage other than the first stage as the second reference clock voltage, the individual boost circuit comprising:

a first PMOS transistor configured to operate in synchronization with a first clock voltage changed between a high voltage value and a low voltage value that is lower than the high voltage value, so as to enter an off-state when the first clock voltage is a high voltage value and to enter an on-state when the first clock voltage is a low voltage value, and being with a gate to which the first clock voltage is applied;

a second PMOS transistor configured to operate in synchronization with a second clock voltage that has a reciprocal relation with the first clock voltage so as to enter an off-state when the second clock voltage is the high voltage value and to enter an on-state when the second clock voltage is the low voltage value, and being with a gate to which the second clock voltage is applied;

an auxiliary capacitor;

an auxiliary charging circuit configured to charge, when the first PMOS transistor is in an off-state and the second PMOS transistor is in an on-state, the auxiliary capacitor with a supplied voltage via the second switching transistor; and a boost charging circuit configured to supply, when the first PMOS transistor is in an on-state and the second PMOS transistor is in an off-state, a voltage to a circuit at a subsequent stage via the first PMOS transistor by a voltage corresponding to the second clock voltage through the auxiliary capacitor charged with the supplied voltage, a source of the first PMOS transistor is connected to the circuit at the subsequent stage, a source of the second PMOS transistor is connected to the auxiliary capacitor and is connected to a drain of the first PMOS transistor, a drain of the second PMOS transistor is connected to a power of the supplied voltage, the auxiliary charging circuit includes a circuit starting from the power, passing the drain of the second PMOS transistor to the source of the second PMOS transistor, and reaching the auxiliary capacitor, and the boost charging circuit includes a circuit starting from the auxiliary capacitor, passing the drain of the first PMOS transistor to the source of the first PMOS transistor, and reaching the circuit at the subsequent stage, a first clock buffer circuit configured to generate, from a first reference clock voltage, a clock voltage applied as the first clock voltage to the gate of the first PMOS transistor; and a second clock buffer circuit configured to generate, from a second reference clock voltage that has a reciprocal relation with the first reference clock voltage, a clock voltage applied as the second clock voltage to the gate of the second PMOS transistor.

22. A boost circuit comprising:

individual boost circuits at a plurality of stages connected in series, wherein each of the individual boost circuits at the plurality of stages includes the individual boost circuit, and wherein a power voltage of an external power is input to the individual boost circuit at a first stage as the supplied voltage and a charged voltage to the circuit at the subsequent stage in the individual boost circuit at a preceding stage is input to the individual boost circuit at each stage other than the first stage as the supplied voltage, wherein a clock voltage from the first clock buffer circuit in the individual boost circuit at the preceding stage is input to the first and second clock buffer circuits of the individual boost circuit at each stage other than the first stage as the first reference clock voltage, and wherein a clock voltage from the third clock buffer circuit in the individual boost circuit at the preceding stage is input to the third and fourth clock buffer circuits of the individual boost circuit at each stage other than the first stage as a second reference clock voltage, the individual boost circuit comprising:

first and fourth switching transistors configured to operate in synchronization with a first clock voltage changed between a high voltage value and a low voltage value that is lower than the high voltage value so as to enter an off-state when the first clock voltage is a high voltage value and to enter an on-state when the first clock voltage is a low voltage value;

second and third switching transistors configured to operate in synchronization with a second clock voltage that has a reciprocal relation with the first clock voltage so as to enter an off-state when the second clock voltage is the high voltage value and to enter an on-state when the second clock voltage is the low voltage value;

a first auxiliary capacitor;

a second auxiliary capacitor;

a first auxiliary charging circuit configured to charge the first auxiliary capacitor with a supplied voltage via the fourth switching transistor when the second switching transistor is in an off-state and the fourth switching transistor is in an on-state;

a first boost charging circuit configured to supply, when the second switching transistor is in an on-state and the fourth switching transistor is in an off-state, a voltage to a circuit at a subsequent stage via the second switching transistor by a voltage corresponding to the first clock voltage through the first auxiliary capacitor charged with the supplied voltage;

a second auxiliary charging circuit configured to charge, when the first switching transistor is in an off-state and the third switching transistor is in an on-state, the second auxiliary capacitor with the supplied voltage via the third switching transistor; and a second boost charging circuit configured to supply, when the first switching transistor is in an on-state and the third switching transistor is in an off-state, a voltage to the circuit at the subsequent stage via the first switching transistor by a voltage corresponding to the second clock voltage through the second auxiliary capacitor charged with the supplied voltage, the first switching transistor is a first PMOS transistor with a gate to which the first clock voltage is applied, the second switching transistor is a second PMOS transistor with a gate to which the second clock voltage is applied, the third switching transistor is a third PMOS transistor with a gate to which the second clock voltage is applied, and the fourth switching transistor is a fourth PMOS transistor with a gate to which the first clock voltage is applied, a first clock buffer circuit configured to generate, from a first reference clock voltage, a clock voltage applied as the first clock voltage to the gate of the first PMOS transistor;

a second clock buffer circuit configured to generate, from the first reference clock voltage, a clock voltage applied as the second clock voltage to the gate of the third PMOS transistor;

a third clock buffer circuit configured to generate, from a second reference clock voltage that has a reciprocal relation with the first reference clock voltage, a clock voltage applied as the second clock voltage to the gate of the second PMOS transistor; and a fourth clock buffer circuit configured to generate, from the second reference clock voltage, a clock voltage applied as the first clock voltage to the gate of the fourth PMOS transistor.

* * * * *